United States Patent
Chen et al.

(10) Patent No.: US 10,568,133 B2
(45) Date of Patent: Feb. 18, 2020

(54) DATA SENDING METHOD, BASE STATION, AND TERMINAL DEVICE

(71) Applicant: HUAWEI TECHNOLOGIES CO., LTD., Shenzhen, Guangdong (CN)

(72) Inventors: Zhe Chen, Shenzhen (CN); Sha Ma, Beijing (CN); Yiling Wu, Beijing (CN); Weiliang Zhang, Beijing (CN); Tong Ji, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 30 days.

(21) Appl. No.: 16/003,102

(22) Filed: Jun. 7, 2018

(65) Prior Publication Data

US 2018/0295648 A1 Oct. 11, 2018

Related U.S. Application Data

(63) Continuation of application No. PCT/CN2015/096629, filed on Dec. 8, 2015.

(51) Int. Cl.
*H04W 74/08* (2009.01)
*H04B 1/7143* (2011.01)

(52) U.S. Cl.
CPC .......... *H04W 74/08* (2013.01); *H04B 1/7143* (2013.01)

(58) Field of Classification Search
CPC .............................. H04W 74/08; H04B 1/7143
See application file for complete search history.

(56) References Cited

U.S. PATENT DOCUMENTS 5,448,569 A * 9/1995 Huang .................... H04B 1/713
370/332
5,568,510 A * 10/1996 Tam ....................... H04B 1/713
375/134

(Continued)

FOREIGN PATENT DOCUMENTS

CN 1296684 A 5/2001
CN 104184548 A 12/2014
(Continued)

OTHER PUBLICATIONS

XP051002876 R1-156408 Ericsson, "Frequency hopping patterns for MTC",3GPP TSG RAN WG1 Meeting #83, Anaheim, USA, Nov. 15-22, 2015,total 3 pages.

(Continued)

*Primary Examiner* — Mehmood B. Khan
(74) *Attorney, Agent, or Firm* — Huawei Technologies Co., Ltd.

(57) ABSTRACT

Embodiments of the present application disclose a random access method, a base station, and a terminal device. The terminal device receives random access configuration information from a base station, and determines a random access channel, a base frequency, and at least two frequency hopping intervals according to the random access configuration information. The terminal device sends, over the random access channel, random access signals to the base station using frequencies determined according to the base frequency and the N frequency hopping intervals. The terminal device may send the random access signals over the random access channel to the base station according to the base frequency the frequency hopping intervals and a frequency hopping pattern.

9 Claims, 13 Drawing Sheets

(56) References Cited

U.S. PATENT DOCUMENTS

| | | | | |
|---|---|---|---|---|
| 5,839,071 | A * | 11/1998 | Johnson | H04W 56/0045 455/440 |
| 6,275,518 | B1 * | 8/2001 | Takahashi | H04B 1/715 370/321 |
| 6,359,924 | B1 * | 3/2002 | Kuhn | H04B 1/713 375/132 |
| 9,854,607 | B1 * | 12/2017 | Chu | H04W 52/241 |
| 9,942,193 | B1 * | 4/2018 | Chu | H04L 61/2038 |
| 2003/0176169 | A1 * | 9/2003 | Pajukoski | H04B 7/0857 455/77 |
| 2004/0005866 | A1 * | 1/2004 | Igarashi | H03C 3/0958 455/78 |
| 2005/0255805 | A1 * | 11/2005 | Hottinen | H04L 1/0618 455/8 |
| 2009/0029715 | A1 * | 1/2009 | Burchardt | H04W 64/00 455/456.1 |
| 2009/0110033 | A1 | 4/2009 | Shattil | |
| 2009/0215450 | A1 * | 8/2009 | Baldemaier | H04W 74/0891 455/434 |
| 2010/0158078 | A1 | 6/2010 | Ro et al. | |
| 2010/0273490 | A1 * | 10/2010 | Velde | H04W 36/0072 455/436 |
| 2011/0150042 | A1 * | 6/2011 | Liu | H04B 1/713 375/133 |
| 2012/0002613 | A1 * | 1/2012 | Kishiyama | H04W 74/0866 370/329 |
| 2012/0026980 | A1 * | 2/2012 | Gao | H04W 36/0077 370/331 |
| 2013/0021979 | A1 * | 1/2013 | Kwon | H04W 56/0045 370/328 |
| 2013/0294353 | A1 * | 11/2013 | Han | H04L 5/001 370/329 |
| 2014/0098781 | A1 | 4/2014 | Vos et al. | |
| 2014/0177525 | A1 * | 6/2014 | Aydin | H04W 4/70 370/328 |
| 2014/0348122 | A1 * | 11/2014 | Li | H04W 76/10 370/330 |
| 2015/0119079 | A1 * | 4/2015 | Tarlazzi | H04W 64/00 455/456.1 |
| 2015/0215935 | A1 | 7/2015 | Taira et al. | |
| 2017/0257817 | A1 * | 9/2017 | Itagaki | H04W 84/12 |
| 2017/0324503 | A1 * | 11/2017 | Zoualfaghari | H04B 7/2628 |

FOREIGN PATENT DOCUMENTS

| | | |
|---|---|---|
| CN | 104811220 A | 7/2015 |
| CN | 104823501 A | 8/2015 |
| JP | 2009049538 A | 3/2009 |
| WO | 2008029812 A1 | 3/2008 |
| WO | 2009088169 A1 | 7/2009 |
| WO | 2014045401 A1 | 3/2014 |
| WO | 2014110757 A1 | 7/2014 |
| WO | WO-2014190537 A1 * | 12/2014 |

OTHER PUBLICATIONS

XP051021479 R1-155241 ZTE, "Remaining issues on PRACH coverage enhancement for MTC",3GPP TSG RAN WG1 Meeting #82bis,Malmö, Sweden, Oct. 5-9, 2015,total 6 pages.

R1-157424 Ericsson, "Narrowband IoT—Random Access Design," 3GPP TSG-RAN WG1#83,Anaheim, USA, Nov. 15-22, 2015,total 10 pages.

3GPP TS 36.331 V12.7.0 3rd Generation Partnership Project; Technical Specification Group Radio Access Network; Evolved Universal Terrestrial Radio Access (E-UTRA); Radio Resource Control (RRC); Protocol specification (Release 12), Technical Specification, Sep. 2015, 453 pages.

3GPP TS 36.211 V12.8.0 3rd Generation Partnership Project; Technical Specification Group Radio Access Network; Evolved Universal Terrestrial Radio Access (E-UTRA); Physical channels and modulation(Release 12), Technical Specification, Dec. 2015, 136 pages.

* cited by examiner

DATA SENDING METHOD, BASE STATION, AND TERMINAL DEVICE

CROSS-REFERENCE TO RELATED APPLICATIONS

This application is a continuation of International Application No. PCT/CN2015/096629, filed on Dec. 8, 2015, which is hereby incorporated by reference in its entirety.

TECHNICAL FIELD

The present application relates to the communications field, and in particular, to a data sending method, a base station, and a terminal device.

BACKGROUND

The Internet of Things (IoT) is a network in which various devices having specific capabilities of awareness, computing, execution, and communication are deployed to obtain information from a physical world, and a network is used to implement information transmission, coordination, and processing, so as to implement interconnection between people and things or between things. In brief, the IoT intends to implement interconnection and interworking between people and things and between things. The IoT may be applied to various fields such as a smart grid, intelligent agriculture, intelligent transportation, and environment monitoring.

The mobile communications standardization organization 3rd Generation Partnership Project (3GPP) has proposed a Narrow Band Internet of Things (NB-IoT) subject in RAN Plenary meeting #69. A single carrier frequency division multiple access (SC-FDMA) technology is planned to be used for uplink of the NB-IoT. To ensure that uplink data of different terminal devices can arrive at a base station side at the same time without interference to each other, a terminal device needs to perform a random access procedure before sending the uplink data. Specifically, the terminal device needs to send a random access signal over a random access channel.

In the prior art, a structure of a random access channel is shown in FIG. 1. In the random access channel, a specific duration is defined as a time unit, and two frequencies $f_0$ and $f_1$ are used. A terminal device sends a random access signal by using only one frequency within each time unit, and sends a random access signal by using another frequency within a next adjacent time unit. That is, there is only one frequency hopping interval "$f_1-f_0$" in an existing random access channel. Consequently, there are many limitations in actual applications.

SUMMARY

A first aspect of embodiments of the present application provides a data sending method.

A terminal device receives random access configuration information from a base station. The terminal device determines a random access channel, a base frequency, and N frequency hopping intervals according to the random access configuration information, where N is greater than or equal to 2. It should be understood that the terminal device may not need to receive random access configuration information from the base station each time before sending a random access signal, but instead, uses the previously received random access configuration information.

The frequency hopping intervals in the random access configuration information may be determined according to actual use, but at least two frequency hopping intervals are determined.

After learning the base frequency and the N frequency hopping intervals, the terminal device may determine, according to the base frequency and the frequency hopping intervals, a frequency for use when sending each random access signal, so that the terminal device may send a random access signal over the random access channel to the base station by using the frequency.

In this embodiment of the present application, the terminal device sends a random access signal using one frequency within each time unit, and sends a random access signal using another frequency within a next adjacent time unit. In addition, there are multiple frequency hopping intervals, that is, the terminal device may send a random access signal according to the base frequency and the multiple frequency hopping intervals. In actual applications, flexibility is relatively high.

In a possible design, the terminal device may send a random access signal in a single-carrier manner. In this manner, the random access configuration information may further include:

frequency hopping pattern information, where the frequency hopping pattern information is used to indicate a frequency used when the terminal device sends a random access signal within each time unit, that is, the frequency hopping pattern information is used to inform the terminal device of a time and a frequency that are used to send a random access signal.

According to the frequency hopping pattern information, the terminal device may send a random access signal using a first frequency within a first time unit, send a random access signal using a second frequency within a second time unit, send a random access signal using a third frequency within a third time unit, and send a random access signal using a fourth frequency within a fourth time unit.

The first time unit, the second time unit, the third time unit, and the fourth time unit may be consecutive or discrete time units.

The first frequency, the second frequency, the third frequency, and the fourth frequency are determined according to the base frequency and the N frequency hopping intervals.

In a possible design, when the base frequency is $f_0$, the N frequency hopping intervals include a first frequency hopping interval $\Delta f_1$ and a second frequency hopping interval $\Delta f_2$, and the first frequency hopping interval $\Delta f_1$ is less than the second frequency hopping interval $\Delta f_2$. Values of the first frequency, the second frequency, the third frequency, and the fourth frequency that are indicated by the frequency hopping pattern information may be specifically one of the following:

1. the first frequency is $f_0$, the second frequency is "$f_0+\Delta f_2$", the third frequency is "$f_0+\Delta f_1$", and the fourth frequency is "$f_0+\Delta f_1+\Delta f_2$";

2. the first frequency is $f_0$, the second frequency is "$f_0+\Delta f_2$", the third frequency is "$f_0-\Delta f_1$", and the fourth frequency is "$f_0+\Delta f_2-\Delta f_1$";

3. the first frequency is $f_0$, the second frequency is "$f_0-\Delta f_2$", the third frequency is "$f_0+\Delta f_1$", and the fourth frequency is "$f_0+\Delta f_1-\Delta f_2$";

4. the first frequency is $f_0$, the second frequency is "$f_0-\Delta f_2$", the third frequency is "$f_0-\Delta f_1$", and the fourth frequency is "$f_0-\Delta f_1-\Delta f_2$";

5. the first frequency is $f_0$, the second frequency is "$f_0+\Delta f_1$", the third frequency is "$f_0+\Delta f_1+\Delta f_2$", and the fourth frequency is "$f_0+\Delta f_2$";

6. the first frequency is $f_0$, the second frequency is "$f_0+\Delta f_1$", the third frequency is "$f_0+\Delta f_1-\Delta f_2$", and the fourth frequency is "$f_0-\Delta f_2$";

7. the first frequency is $f_0$, the second frequency is "$f_0-\Delta f_1$", the third frequency is "$f_0+\Delta f_2-\Delta f_1$", and the fourth frequency is "$f_0+\Delta f_2$";

8. the first frequency is $f_0$, the second frequency is "$f_0-\Delta f_1$", the third frequency is "$f_0-\Delta f_1-\Delta f_2$", and the fourth frequency is "$f_0-\Delta f_2$".

Optionally, values of the first frequency, the second frequency, the third frequency, and the fourth frequency that are indicated by the frequency hopping pattern information may be, in addition to the values indicated in the foregoing content, another single-carrier frequency hopping pattern, provided that the terminal device can send a random access signal according to $f_0$, $\Delta f_1$, and $\Delta f_2$. Details are not described herein.

In this embodiment of the present application, based on $f_0$, $\Delta f_1$, and $\Delta f_2$, the frequency hopping pattern information may be used to instruct the terminal device to send a random access signal over a single-carrier random access channel in multiple manners. That is, there may be multiple choices for determining an optimal frequency value for sending a random access signal, thereby enriching diverse solutions. In addition, when the first time unit, the second time unit, the third time unit, and the fourth time unit are consecutive time units, a random access signal from the terminal device may experience $\Delta f_1$ and $\Delta f_2$ within the shortest duration, so that quantities of $\Delta f_1$ and $\Delta f_2$ are the largest. That is, each random access signal may be enabled to experience the two frequency hopping intervals, so that use efficiency of a random access signal is improved in actual applications.

In a possible design, the terminal device may send a random access signal in a multi-carrier manner. A dual-carrier manner is used as an example herein. In this manner, the random access configuration information may further include:

frequency hopping pattern information, where the frequency hopping pattern information indicates a frequency used when the terminal device sends a random access signal within each time unit.

According to the frequency hopping pattern information, the terminal device sends a random access signal using a first frequency and a second frequency within a first time unit, and sends a random access signal using a third frequency and a fourth frequency within a second time unit.

The first time unit and the second time unit are consecutive or discrete time units.

The first frequency, the second frequency, the third frequency, and the fourth frequency are determined according to the base frequency and the N frequency hopping intervals.

In a possible design, when the base frequency is $f_0$, the N frequency hopping intervals include a first frequency hopping interval $\Delta f_1$ and a second frequency hopping interval $\Delta f_2$, and the first frequency hopping interval $\Delta f_1$ is less than the second frequency hopping interval $\Delta f_2$. Values of the first frequency, the second frequency, the third frequency, and the fourth frequency that are indicated by the frequency hopping pattern information may be one of the following:

1. the first frequency is $f_0$, the second frequency is "$f_0+\Delta f_1$", the third frequency is "$f_0+\Delta f_2$", and the fourth frequency is "$f_0+\Delta f_1+\Delta f_2$";

2. the first frequency is $f_0$, the second frequency is "$f_0+\Delta f_1$", the third frequency is "$f_0-\Delta f_2$", and the fourth frequency is "$f_0+\Delta f_1-\Delta f_2$";

3. the first frequency is $f_0$, the second frequency is "$f_0-\Delta f_1$", the third frequency is "$f_0+\Delta f_2-\Delta f_1$", and the fourth frequency is "$f_0+\Delta f_2$";

4. the first frequency is $f_0$, the second frequency is "$f_0-\Delta f_1$", the third frequency is "$f_0-\Delta f_2$", and the fourth frequency is "$f_0-\Delta f_2-\Delta f_1$"; or 5. the first frequency is $f_0$, the second frequency is "$f_0+\Delta f_2$", the third frequency is "$f_0+\Delta f_1$", and the fourth frequency is "$f_0+\Delta f_2+\Delta f_1$";

6. the first frequency is $f_0$, the second frequency is "$f_0-\Delta f_2$", the third frequency is "$f_0+\Delta f_1$", and the fourth frequency is "$f_0+\Delta f_1-\Delta f_2$";

7. the first frequency is $f_0$, the second frequency is "$f_0+\Delta f_2$", the third frequency is "$f_0-\Delta f_1$", and the fourth frequency is "$f_0+\Delta f_2-\Delta f_1$"; or 8. the first frequency is $f_0$, the second frequency is "$f_0-\Delta f_2$", the third frequency is "$f_0-\Delta f_1$", and the fourth frequency is "$f_0-\Delta f_2-\Delta f_1$".

Optionally, values of the first frequency, the second frequency, the third frequency, and the fourth frequency that are indicated by the frequency hopping pattern information may be, in addition to the values indicated in the foregoing content, another dual-carrier frequency hopping pattern, provided that the terminal device can send a random access signal according to $f_0$, $\Delta f_1$, and $\Delta f_2$. Details are not described herein.

Likewise, in the first aspect of the embodiments of the present application, based on $f_0$, $\Delta f_1$, and $\Delta f_2$, the frequency hopping pattern information not only may be used to instruct the terminal device to send random access signal over a single-carrier random access channel, but also may be used to instruct the terminal device to send a random access signal over a dual-carrier random access channel. When the first time unit and the second time unit are consecutive time units, in the fourth implementation of the first aspect of the embodiments of the present application, a random access signal from the terminal device may experience $\Delta f_1$ and $\Delta f_2$ within shortest duration, so that quantities of $\Delta f_1$ and $\Delta f_2$ are the largest, that is, each random access signal may be enabled to experience the two frequency hopping intervals, so that use efficiency of a random access signal is improved.

In a possible design, after sending a random access signal over the random access channel to the base station according to the base frequency and the N frequency hopping intervals, the terminal device may further receive control information fed back by the base station, where the control information includes a sending advance, the sending advance is obtained by the base station according to a delay estimate, and the delay estimate is obtained by the base station according to a phase difference between random access signals and the N frequency hopping intervals; and then the terminal device sends uplink data according to the sending advance.

For this embodiment of the present application, in actual application, a terminal device needs to perform a random access procedure before sending uplink data. Specifically, the terminal device needs to send a random access signal over the random access channel. The base station side receives the random access signal and estimates a propagation time of the signal. Then the base station sends a control information to the terminal device, so as to require the terminal device to send uplink data with a timing advance. In this case, because the sending advance is obtained by the base station according to a delay estimate, and the delay estimate is obtained by the base station according to a phase difference between the random access signals and the N frequency hopping intervals, the base station may calculate a delay estimate by using multiple phase differences, so as to determine the sending advance. Because a relatively large frequency hopping interval may improve accuracy of a delay estimate, and a relatively small frequency hopping interval may increase a coverage area of a base station, a manner of multiple frequency hopping intervals is used in this embodiment, so that in actual application, considerations can be given to both a coverage area and accuracy of a delay estimate.

In a possible design, the terminal device may receive the random access configuration information from the base station in a broadcast or dedicated signaling manner.

In this embodiment of the present application, the base station may send the random access configuration information to the terminal device by using multiple channels, for example, the base station sends the random access configuration information in a broadcast or dedicated signaling manner, or the base station sends the random access configuration information by using another sending channel, that is, the base station may select an optimal sending channel according to an actual application situation.

A second aspect of the embodiments of the present application provides a data sending method:

A base station sends random access configuration information to a terminal device. The random access configuration information is used to indicate a random access channel, a base frequency, and N frequency hopping intervals, where N is greater than or equal to 2. That is, the frequency hopping intervals in the random access configuration information may be determined according to an actual application situation, but there are at least two frequency hopping intervals.

In this embodiment of the present application, the terminal device sends a random access signal by using only one frequency within each time unit, and sends a random access signal by using another frequency within a next adjacent time unit. In addition, there are multiple frequency hopping intervals, that is, the terminal device may send a random access signal according to the base frequency and the multiple frequency hopping intervals. In actual application, flexibility is relatively high.

In a possible design, the base station may receive a random access signal from the terminal device in a single-carrier manner. In this case, the random access configuration information may further include:

frequency hopping pattern information, where the frequency hopping pattern information is used to instruct the terminal device to send a random access signal by using a first frequency within a first time unit, send a random access signal by using a second frequency within a second time unit, send a random access signal by using a third frequency within a third time unit, and send a random access signal by using a fourth frequency within a fourth time unit, that is, the frequency hopping pattern information is used to inform the terminal device of a time and a frequency that are used to send a random access signal.

The first time unit, the second time unit, the third time unit, and the fourth time unit are consecutive or discrete time units.

The first frequency, the second frequency, the third frequency, and the fourth frequency are determined according to the base frequency and the N frequency hopping intervals.

In a possible design, in a second implementation in the second aspect of the embodiments of the present application, when the base frequency is $f_0$, the N frequency hopping intervals include a first frequency hopping interval $\Delta f_1$ and a second frequency hopping interval $\Delta f_2$, and the first frequency hopping interval $\Delta f_1$ is less than the second frequency hopping interval $\Delta f_2$. Values of the first frequency, the second frequency, the third frequency, and the fourth frequency that are indicated by the frequency hopping pattern information may be one of the following:

1. the first frequency is $f_0$, the second frequency is "$f_0+\Delta f_2$", the third frequency is "$f_0+\Delta f_1$", and the fourth frequency is "$f_0+\Delta f_1+\Delta f_2$";

2. the first frequency is $f_0$, the second frequency is "$f_0+\Delta f_2$", the third frequency is "$f_0-\Delta f_1$", and the fourth frequency is "$f_0+\Delta f_2-\Delta f_1$";

3. the first frequency is $f_0$, the second frequency is "$f_0-\Delta f_2$", the third frequency is "$f_0+\Delta f_1$", and the fourth frequency is "$f_0+\Delta f_1-\Delta f_2$";

4. the first frequency is $f_0$, the second frequency is "$f_0-\Delta f_2$", the third frequency is "$f_0-\Delta f_1$", and the fourth frequency is "$f_0-\Delta f_1-\Delta f_2$";

5. the first frequency is $f_0$, the second frequency is "$f_0+\Delta f_1$", the third frequency is "$f_0+\Delta f_1+\Delta f_2$", and the fourth frequency is "$f_0+\Delta f_2$";

6. the first frequency is $f_0$, the second frequency is "$f_0+\Delta f_1$", the third frequency is "$f_0+\Delta f_1-\Delta f_2$", and the fourth frequency is "$f_0-\Delta f_2$";

7. the first frequency is $f_0$, the second frequency is "$f_0-\Delta f_1$", the third frequency is "$f_0+\Delta f_2-\Delta f_1$", and the fourth frequency is "$f_0+\Delta f_2$"; or 8. the first frequency is $f_0$, the second frequency is "$f_0-\Delta f_1$", the third frequency is "$f_0-\Delta f_1-\Delta f_2$", and the fourth frequency is "$f_0-\Delta f_2$".

Optionally, values of the first frequency, the second frequency, the third frequency, and the fourth frequency that are indicated by the frequency hopping pattern information may be, in addition to the values indicated in the foregoing content, another single-carrier frequency hopping pattern, provided that the terminal device can send a random access signal according to $f_0$, $\Delta f_1$, and $\Delta f_2$. Details are not described herein.

In this embodiment of the present application, based on $f_0$, $\Delta f_1$, and $\Delta f_2$, the frequency hopping pattern information may be used to indicate multiple manners of sending a random access signal, that is, there may be multiple choices for determining an optimal frequency value for sending a random access signal, thereby enriching diverse solutions. In addition, when the first time unit, the second time unit, the third time unit, and the fourth time unit are consecutive time units, a random access signal from the terminal device may also experience $\Delta f_1$ and $\Delta f_2$ within shortest duration, so that quantities of $\Delta f_1$ and $\Delta f_2$ are the largest. Specifically, each random access signal may also be enabled to experience the two frequency hopping intervals, so that use efficiency of a random access signal is improved in actual application.

In a possible design, the base station may receive a random access signal from the terminal device in a multi-carrier manner. A dual-carrier manner is used as an example herein. In this manner, the random access configuration information may further include:

frequency hopping pattern information, where the frequency hopping pattern information is used to instruct the terminal device to send a random access signal by using a first frequency and a second frequency within a first time unit, and send a random access signal by using a third frequency and a fourth frequency within a second time unit, that is, the frequency hopping pattern information is used to inform the terminal device of a time and a frequency that are used to send a random access signal.

The first time unit and the second time unit are consecutive or discrete time units.

The first frequency, the second frequency, the third frequency, and the fourth frequency are determined according to the base frequency and the N frequency hopping intervals.

In a possible design, when the base frequency is $f_0$, the N frequency hopping intervals include a first frequency hopping interval $\Delta f_1$ and a second frequency hopping interval $\Delta f_2$, and the first frequency hopping interval $\Delta f_1$ is less than the second frequency hopping interval $\Delta f_2$. Values of the first frequency, the second frequency, the third frequency, and the fourth frequency that are indicated by the frequency hopping pattern information may be one of the following:

1. the first frequency is $f_0$, the second frequency is "$f_0+\Delta f_1$", the third frequency is "$f_0+\Delta f_2$", and the fourth frequency is "$f_0+\Delta f_1+\Delta f_2$";
2. the first frequency is $f_0$, the second frequency is "$f_0+\Delta f_1$", the third frequency is "$f_0-\Delta f_2$", and the fourth frequency is "$f_0+\Delta f_1-\Delta f_2$";
3. the first frequency is $f_0$, the second frequency is "$f_0-\Delta f_1$", the third frequency is "$f_0+\Delta f_2-\Delta f_1$", and the fourth frequency is "$f_0+\Delta f_2$";
4. the first frequency is $f_0$, the second frequency is "$f_0-\Delta f_1$", the third frequency is "$f_0-\Delta f_2$", and the fourth frequency is "$f_0-\Delta f_2-\Delta f_1$";
5. the first frequency is $f_0$, the second frequency is "$f_0+\Delta f_2$", the third frequency is "$f_0+\Delta f_1$", and the fourth frequency is "$f_0+\Delta f_2+\Delta f_1$";
6. the first frequency is $f_0$, the second frequency is "$f_0-\Delta f_2$", the third frequency is "$f_0+\Delta f_1$", and the fourth frequency is "$f_0+\Delta f_1-\Delta f_2$";
7. the first frequency is $f_0$, the second frequency is "$f_0+\Delta f_2$", the third frequency is "$f_0-\Delta f_1$", and the fourth frequency is "$f_0+\Delta f_2-\Delta f_1$";
8. the first frequency is $f_0$, the second frequency is "$f_0-\Delta f_2$", the third frequency is "$f_0-\Delta f_1$", and the fourth frequency is "$f_0-\Delta f_2-\Delta f_1$".

Optionally, values of the first frequency, the second frequency, the third frequency, and the fourth frequency that are indicated by the frequency hopping pattern information may be, in addition to the values indicated in the foregoing content, another dual-carrier frequency hopping pattern, provided that the terminal device can send a random access signal according to $f_0$, $\Delta f_1$, and $\Delta f_2$. Details are not described herein.

In a possible design, after receiving a random access signal from the terminal device over the random access channel according to the base frequency and the N frequency hopping intervals, the base station may further determine at least three target random access signals according to the N frequency hopping intervals. Then the base station obtains a phase difference between the target random access signals according to the determined target random access signals, then obtains a target delay estimate corresponding to the phase difference, then determines a sending advance according to the target delay estimate, and finally sends control information to the terminal device. The control information includes the sending advance.

For this embodiment of the present application, in actual applications, a manner of multiple frequency hopping intervals is used in this embodiment, so that considerations can be given to both a coverage area and accuracy of a delay estimate.

In a possible design, that the base station may determine at least three target random access signals according to the N frequency hopping intervals is specifically as follows:

The base station determines a first random access signal, a second random access signal, a third random access signal, and a fourth random access signal as the target random access signals.

A frequency hopping interval between a frequency of the first random access signal received by the base station and a frequency of the second random access signal received by the base station is the first frequency hopping interval.

A frequency hopping interval between a frequency of the third random access signal received by the base station and a frequency of the fourth random access signal received by the base station is the second frequency hopping interval.

The second random access signal and the third random access signal are a same random access signal or different random access signals.

In a possible design, that the base station obtains a phase difference between the target random access signals according to the determined at least three target random access signals is specifically as follows:

The base station determines a first phase difference between the first random access signal and the second random access signal, and determines a second phase difference between the third random access signal and the fourth random access signal.

That the base station obtains a target delay estimate corresponding to the phase difference is specifically as follows:

The base station determines a corresponding first delay estimate $T_{coarse}$ according to the first phase difference, and determines a corresponding second delay estimate $T_{fine}$ according to the second phase difference.

The base station may calculate the target delay estimate $T_{final}$ according to the following formulas:

$$T_{final} = T_{fine} + \hat{k}T_{step}, \text{ and}$$

$$\hat{k} = \underset{k \in Z}{\mathrm{argmin}}\{|T_{coarse} - (T_{fine} + kT_{step})|\}; \text{ where}$$

$$T_{step} = 1/\Delta f_2, \text{ and } Z \text{ is a set of integers.}$$

Optionally, the base station may calculate the target delay estimate based on the first delay estimate and the second delay estimate according to another formula. Details are not described herein.

A third aspect of the embodiments of the present application provides a terminal device. The terminal device has functions of implementing terminal device behavior in the foregoing method designs. The functions may be implemented by hardware, or may be implemented by hardware by executing corresponding software. The hardware or software includes one or more modules corresponding to the foregoing functions. The modules may be software and/or hardware.

In a possible design, a structure of the terminal device includes a receiver, a transmitter, and a processor. The receiver is configured to receive random access configuration information from a base station. The processor is configured to determine a random access channel, a base frequency, and N frequency hopping intervals according to the random access configuration information received by the receiving module, where N is greater than or equal to 2. The transmitter is configured to send, over the random access channel determined by the processing module, a random access signal to the base station according to the base frequency and the N frequency hopping intervals that are determined by the processing module.

A fourth aspect of the embodiments of the present application provides a base station. The base station has functions of implementing base station behavior in the foregoing method designs. The functions may be implemented by hardware, or may be implemented by hardware by executing corresponding software. The hardware or software includes one or more modules corresponding to the foregoing functions.

In a possible design, a structure of the base station includes a receiver, a processor, and a transmitter. The receiver and the transmitter are configured to: support communication between the base station and a terminal device, so as to receive information or an instruction that is included in the foregoing methods and that is sent by the terminal device. The processor is configured to enable the base station to perform a corresponding function in the foregoing methods. The transmitter is configured to support communication between the base station and the terminal device, so as to send information or an instruction included in the foregoing methods to the terminal device. The base station may further include a memory. The memory is coupled to the processor, and stores program instructions and data for use by the base station.

Compared with the prior art, in the solutions provided in the present application, a terminal device may receive random access configuration information from a base station. The random access configuration information includes a base frequency and N frequency hopping intervals. The terminal device sends a random access signal over a random access channel to the base station according to the base frequency and the N frequency hopping intervals. That is, different from the prior art in which there is only a random access channel with a single-frequency-hopping structure, the present application provides a random access channel with a multi-frequency-hopping structure. In actual applications, compared with the random access channel with the single-frequency-hopping structure described in the prior art, the random access channel with the multi-frequency-hopping structure described in the present application provides higher flexibility.

DETAILED DESCRIPTION OF EMBODIMENTS

Embodiments of the present application provide a data sending method, a base station, and a terminal device, so that considerations can be given to both a coverage area and accuracy of a delay estimate.

The following describes the technical solutions in the embodiments of the present application with reference to the accompanying drawings. Apparently, the described embodiments are merely a part rather than all of the embodiments of the present application. All other embodiments obtained by persons of ordinary skill in the art based on the embodiments of the present application without creative efforts shall fall within the protection scope of the present application.

In the specification, claims, and accompanying drawings of the present application, the terms "first", "second", "third", "fourth", and so on (if existent) are intended to distinguish between similar objects and do not necessarily indicate a specific order or sequence. It should be understood that the data termed in such a way is interchangeable in proper circumstances, so that the embodiments described herein can be implemented in other orders than the order illustrated or described herein. In addition, the terms "include", "contain" and any variations thereof, are intended to cover a non-exclusive inclusion. For example, a process, method, system, product, or device that includes a list of steps or units is not necessarily limited to those steps or units, but may include other steps or units not expressly listed or inherent to such a process, method, system, product, or device.

The present application can be applied to a Long Term Evolution (LTE) system or a Long Term Evolution Advanced (LTE-A) system. In addition, the present application may also be applied to another communications system, provided that both an entity that may send information and another entity that may receive information exist in the communications system.

Figure 1:
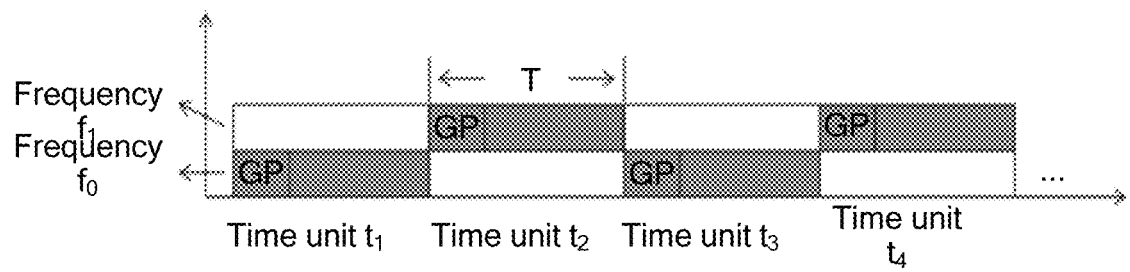
FIG. 1 is a schematic diagram of random access in the prior art.
Figure 2:
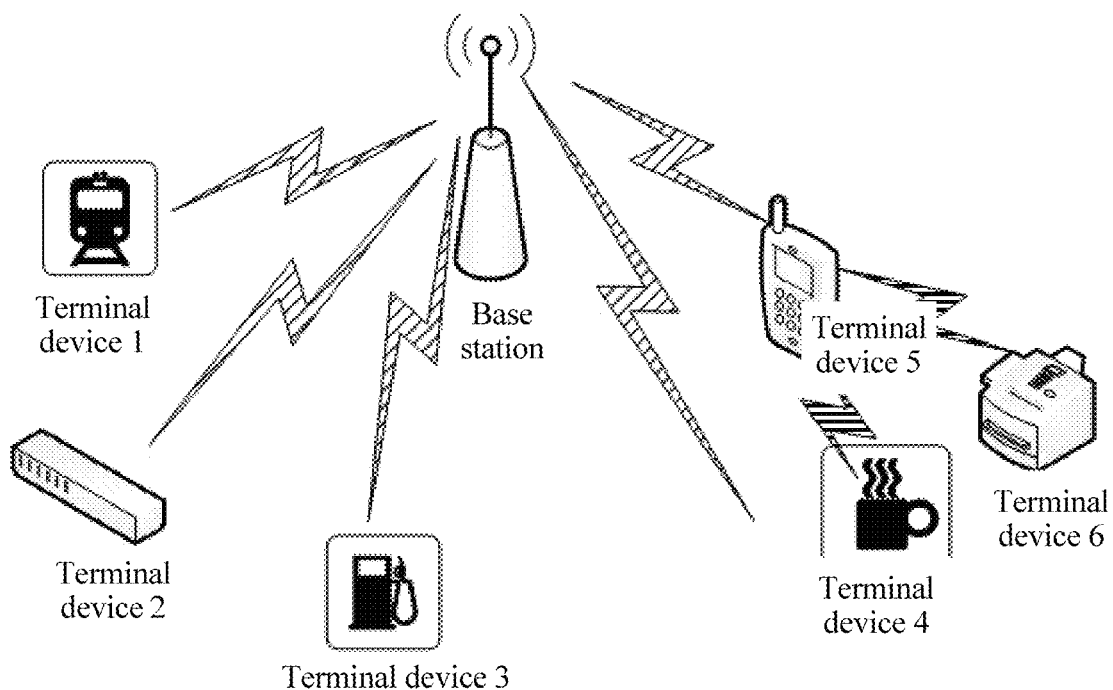
FIG. 2 is a schematic diagram of a network system architecture wherein embodiments of the present application are implemented.

As shown in FIG. 2, a base station and terminal devices 1 to 6 form a communications system. In the communications system, the base station and the terminal device 1 to the terminal device 6 may send data to each other. In addition, the terminal device 4 to the terminal device 6 may also form a communications system. In the communications system, the terminal device 5 may send information to one or more terminal devices among the terminal device 4 to the terminal device 6.

Although the LTE system is used as an example for description in the foregoing background part, persons skilled in the art should know that the present application is not only applied to the LTE system. It may also be applied to other wireless communications systems, such as Global System for Mobile Communications (GSM), Universal Mobile Telecommunications System (UMTS), Code Division Multiple Access (CDMA) systems, or other network systems. The following describes specific embodiments by using the LTE system as an example.

The terminal device mentioned in the embodiments of the present application may be a device that provides a user with voice and/or data connectivity, a handheld device with a radio connection function, or another processing device connected to a radio modem. The terminal device may communicate with one or more core networks by using a radio access network (RAN). The terminal device may be a mobile (wireless) terminal, such as a mobile phone (also referred to as a "cellular" phone) and a computer with a mobile terminal. For example, the wireless terminal may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be called a system, a subscriber unit, a subscriber station, a mobile station, a mobile terminal, a remote station, an access point, a remote terminal, an access terminal, a user terminal, a user agent, a user device, or user equipment.

When multiple terminal devices send uplink data to a base station at the same time, interference to each other may be caused. In view of this, the mobile communications standardization organization 3GPP proposes a Narrow Band Internet of Things (NB-IoT) subject in RAN Plenary meeting #69. A Frequency Division Multiple Access (SC-FDMA) technology is planned to be used in an uplink of the NB-IoT. In this technology, to ensure that uplink data of different terminal devices can arrive at a base station side at the same time without interference to each other, a terminal device needs to perform a random access procedure before sending the uplink data. Specifically, the terminal device needs to send a random access signal over a random access channel.

As shown in FIG. 2, the terminal device 1 to the terminal device 6 each needs to send uplink data to a base station. Before sending the uplink data, the terminal device 1 to the terminal device 6 each needs to perform a random access procedure. That is, each of the terminal devices 1 to 6 needs to send a random access signal over a random access channel according to random access configuration information indicated by the base station. The random access configuration information sent to the terminal devices by the base station indicates that there are at least two frequency hopping intervals.

In this embodiment, the base station may instruct the terminal device to send a random access signal based on a single carrier, or may instruct the terminal device to send a random access signal based on multiple carriers. The following separately describes the two cases in details.

I. A Base Station Instructs a Terminal Device to Send a Random Access Signal Based on a Single Carrier.

Figure 3:
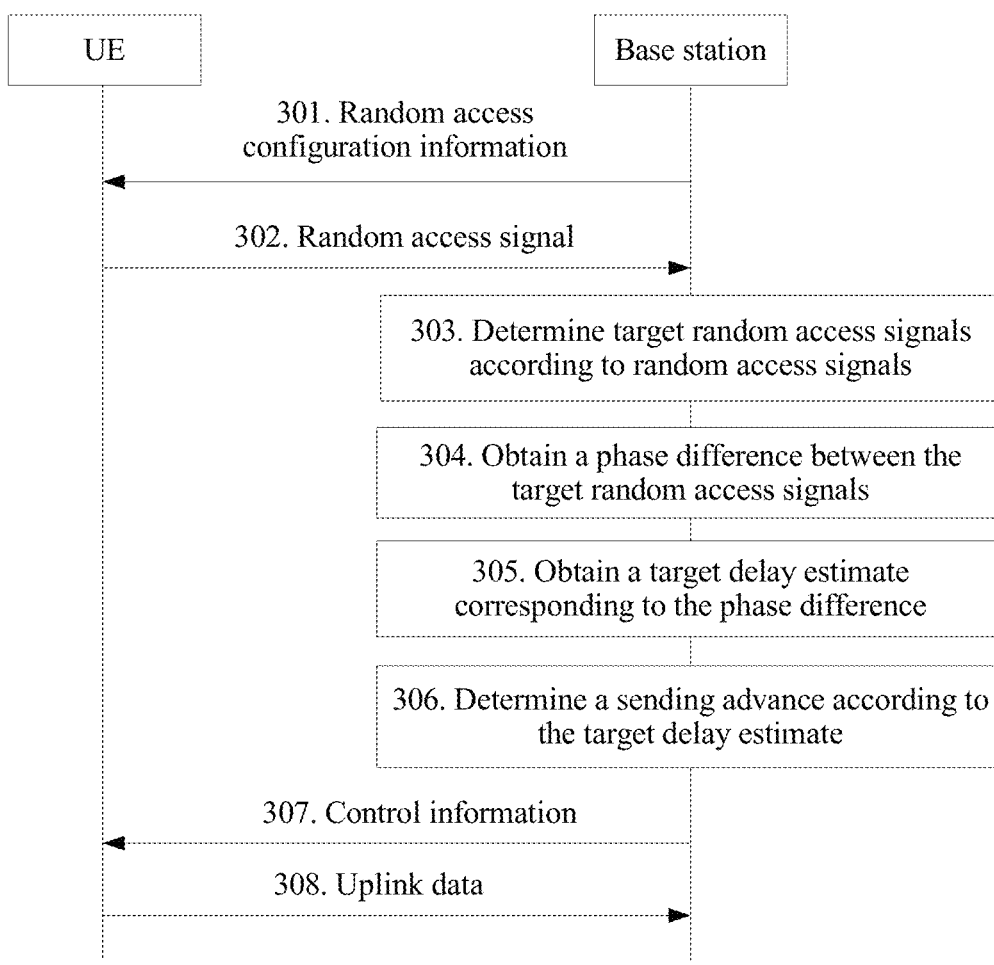
FIG. 3 is a schematic diagram of a data sending method according to an embodiment of the present application.

Referring to FIG. 3, a data sending method in an embodiment of the present application includes the following steps.

301. A base station sends random access configuration information to a terminal device.

In this embodiment, after generating the random access configuration information, the base station sends the random access configuration information to the terminal device, so that the terminal device sends a random access signal according to the random access configuration information.

It may be understood that the base station may send the random access configuration information to the terminal device in a broadcast or dedicated signaling manner, or may send the random access configuration information to the terminal device in another manner. This is not specifically limited herein.

The random access configuration information is used to indicate a random access channel, a base frequency $f_0$, and N frequency hopping intervals, where N is greater than or equal to 2.

In actual applications, in addition to the foregoing parameters, the random access configuration information may further include at least one of the following parameters:

parameter 1: random access channel format;
parameter 2: subcarrier spacing;
parameter 3: duration of a basic time unit $T_{hop}$;
parameter 4: total duration of a random access channel or a quantity of basic time units $T_{hop}$; or
parameter 5: frequency hopping pattern information.

The random access channel format is used to indicate whether a terminal device sends a random access signal in a manner of a single frequency hopping interval or in a manner of multiple frequency hopping intervals.

It should be noted that if the random access channel format indicates the terminal device to send a random access signal in the manner of a single frequency hopping interval, a manner in which the terminal device sends a random access signal is the same as an existing manner.

The subcarrier spacing $\Delta f$ is determined according to basic parameters of a specific random access channel, and is generally 15 KHz or may be another value, for example, 3.75 KHz. This is not specifically limited herein.

The duration of the basic time unit $T_{hop}$ is used to indicate specific duration of one time unit. This parameter is related to a basic parameter of a random access channel, and is not specifically limited herein.

The total duration of a random access channel or the quantity of basic time units $T_{hop}$ is used to indicate specific duration or a specific quantity of time units within which the terminal device needs to send a random access signal. This parameter is related to a basic parameter of a random access channel, and is not specifically limited herein.

The frequency hopping pattern information is used to indicate a frequency used when the terminal device sends a random access signal within each time unit, and may be specifically in multiple forms.

In this embodiment, the random access configuration information may indicate the N frequency hopping intervals in multiple manners, for example, the random access configuration information directly carries values of the N frequency hopping intervals, or carries values of N frequencies, so as to determine the N frequency hopping intervals according to differences between the values of the N frequencies and a value of the base frequency. Alternatively, the N frequency hopping intervals may be indicated in another manner. This is not specifically limited herein.

In addition, the N frequency hopping intervals may be specific values, or may be a specific multiple of the subcarrier spacing $\Delta f$. A specific form is not limited herein.

For ease of description of this embodiment of the present application, a single carrier and dual frequency hopping intervals are used as an example for description in this embodiment. The dual frequency hopping intervals are a first frequency hopping interval $\Delta f_1$ and a second frequency hopping interval $\Delta f_2$, where $\Delta f_1$ is less than $\Delta f_2$.

Based on the base frequency $f_0$, $\Delta f_1$, and $\Delta f_2$, specific frequency hopping pattern information may be in multiple forms. The following uses some specific examples for description. FIG. 4 to FIG. 11 show eight relatively common frequency hopping patterns.

Figure 4:
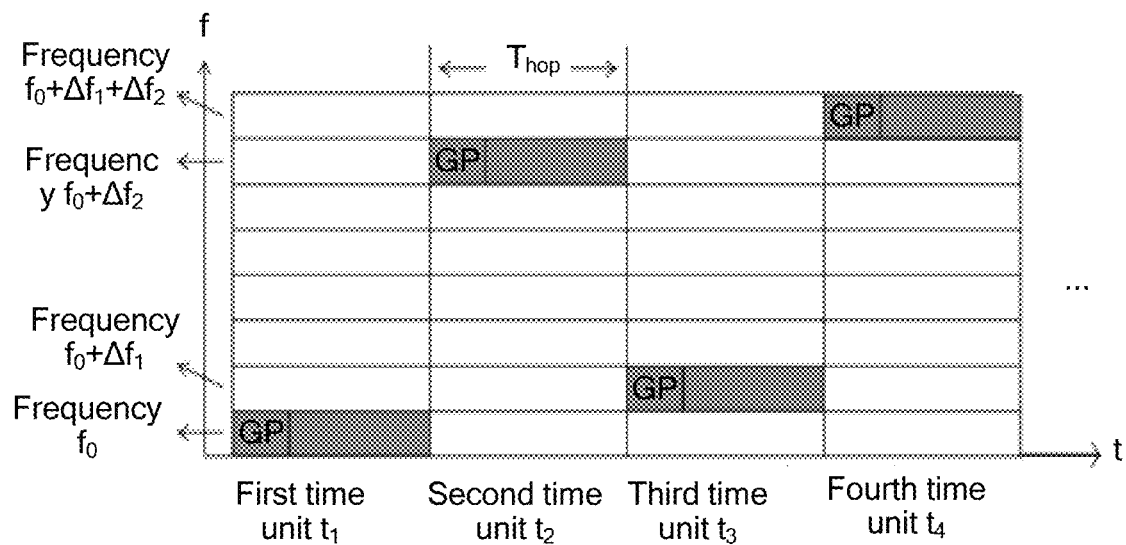
FIG. 4 to FIG. 11 are schematic diagrams of single-carrier frequency hopping patterns according to an embodiment of the present application.

A frequency hopping pattern in FIG. 4 is used to instruct a terminal device to send a random access signal by using $f_0$ within a time unit $t_1$, send a random access signal by using "$f_0+\Delta f_2$" within a time unit $t_2$, send a random access signal by using "$f_0+\Delta f_1$" within a time unit $t_3$, and send a random access signal by using "$f_0+\Delta f_1+\Delta f_2$" within a time unit $t_4$.

Figure 5:
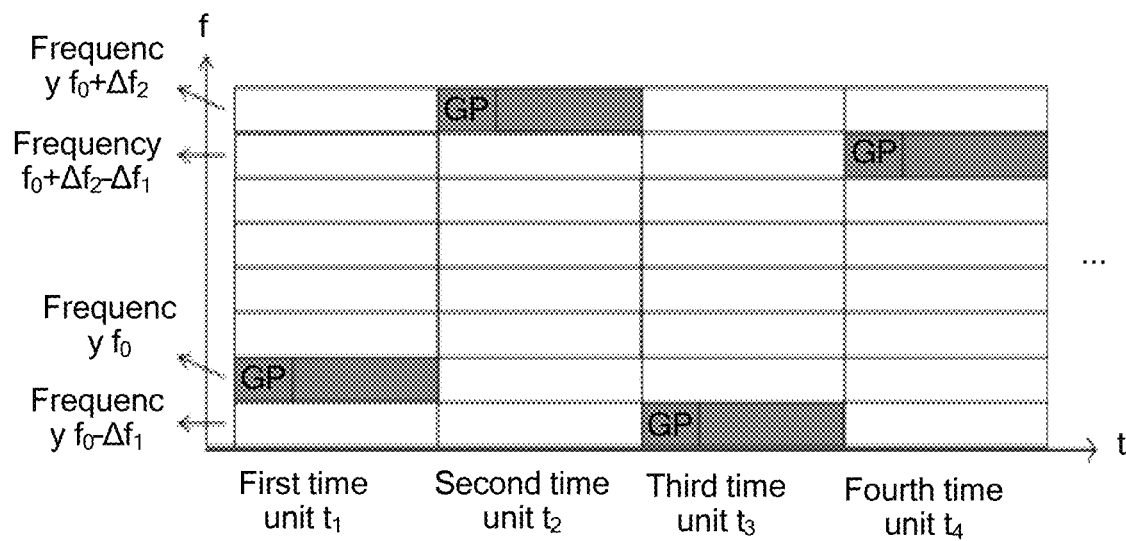

A frequency hopping pattern in FIG. 5 is used to instruct a terminal device to send a random access signal by using $f_0$ within a time unit $t_1$, send a random access signal by using "$f_0+\Delta f_2$" within a time unit $t_2$, send a random access signal by using "$f_0-\Delta f_1$" within a time unit $t_3$, and send a random access signal by using "$f_0+\Delta f_2-\Delta f_1$" within a time unit $t_4$.

Figure 6:
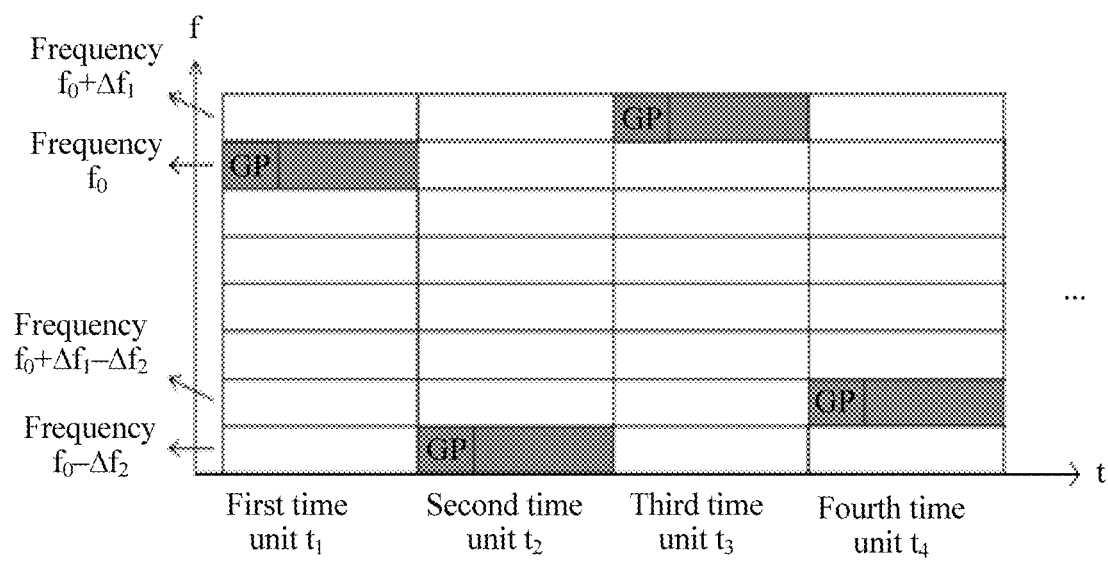

A frequency hopping pattern in FIG. 6 is used to instruct a terminal device to send a random access signal by using $f_0$ within a time unit $t_1$, send a random access signal by using "$f_0-\Delta f_2$" within a time unit $t_2$, send a random access signal by using "$f_0+\Delta f_1$" within a time unit $t_3$, and send a random access signal by using "$f_0+\Delta f_1-\Delta f_2$" within a time unit $t_4$.

Figure 7:
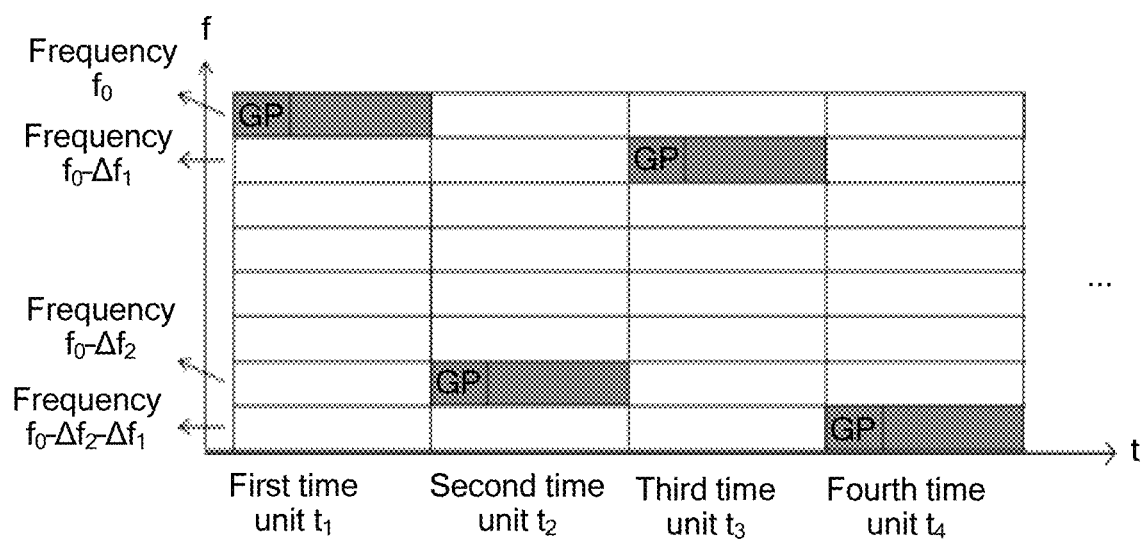

A frequency hopping pattern in FIG. 7 is used to instruct a terminal device to send a random access signal by using $f_0$ within a time unit $t_1$, send a random access signal by using "$f_0-\Delta f_2$" within a time unit $t_2$, send a random access signal by using "$f_0-\Delta f_1$" within a time unit $t_3$, and send a random access signal by using "$f_0-\Delta f_1-\Delta f_2$" within a time unit $t_4$.

Figure 8:
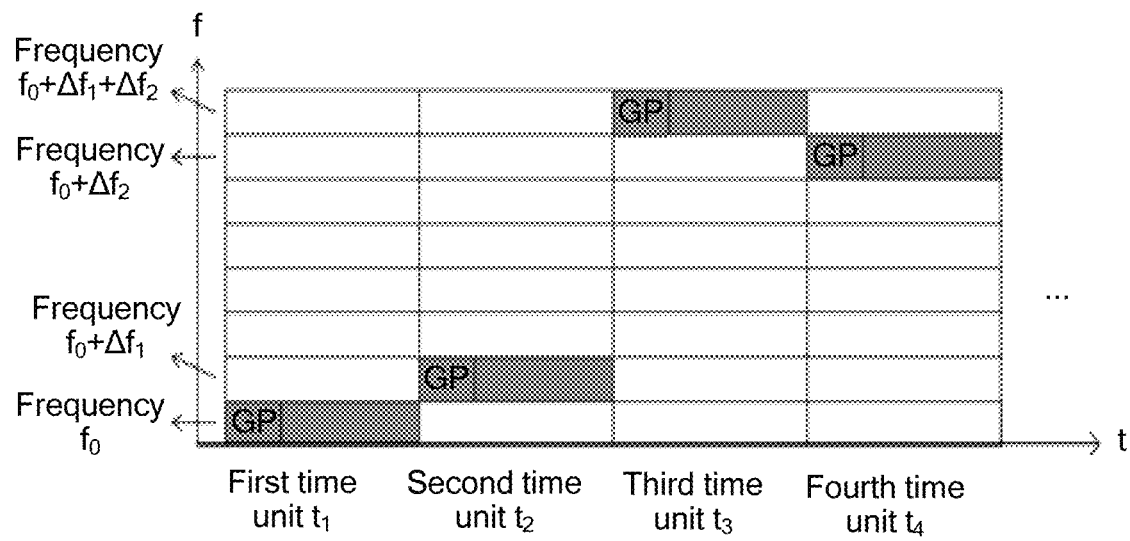

A frequency hopping pattern in FIG. 8 is used to instruct a terminal device to send a random access signal by using $f_0$ within a time unit $t_1$, send a random access signal by using "$f_0+\Delta f_1$" within a time unit $t_2$, send a random access signal by using "$f_0+\Delta f_1+\Delta f_2$" within a time unit $t_3$, and send a random access signal by using "$f_0+\Delta f_2$" within a time unit $t_4$.

Figure 9:
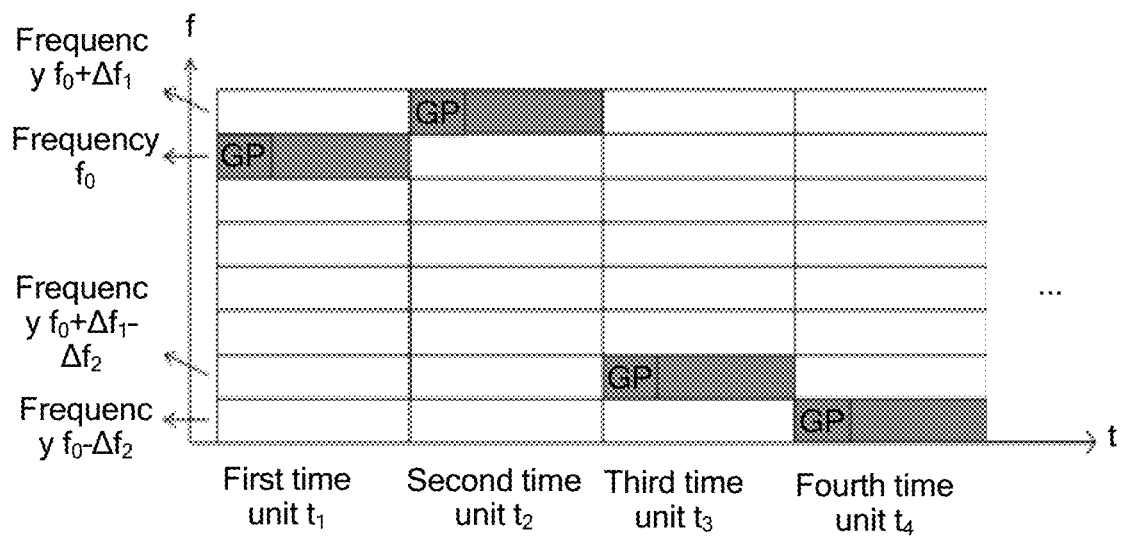

A frequency hopping pattern in FIG. 9 is used to instruct a terminal device to send a random access signal by using $f_0$ within a time unit $t_1$, send a random access signal by using "$f_0+\Delta f_1$" within a time unit $t_2$, send a random access signal by using "$f_0+\Delta f_1-\Delta f_2$" within a time unit $t_3$, and send a random access signal by using "$f_0-\Delta f_2$" within a time unit $t_4$.

Figure 10:
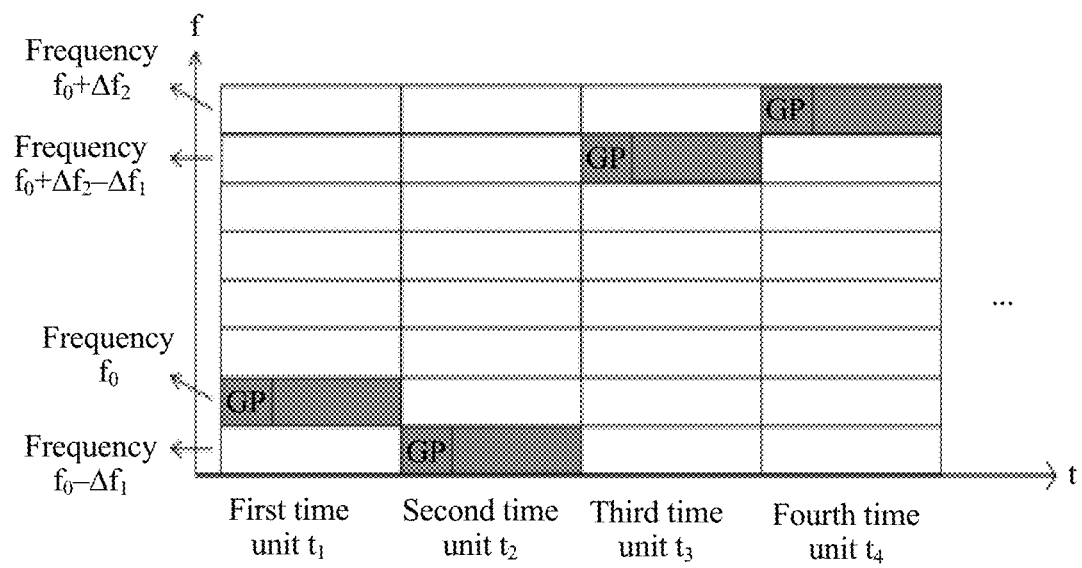

A frequency hopping pattern in FIG. 10 is used to instruct a terminal device to send a random access signal by using $f_0$ within a time unit $t_1$, send a random access signal by using "$f_0-\Delta f_1$" within a time unit $t_2$, send a random access signal by using "$f_0+\Delta f_2-\Delta f_1$" within a time unit $t_3$, and send a random access signal by using "$f_0+\Delta f_2$" within a time unit $t_4$.

Figure 11:
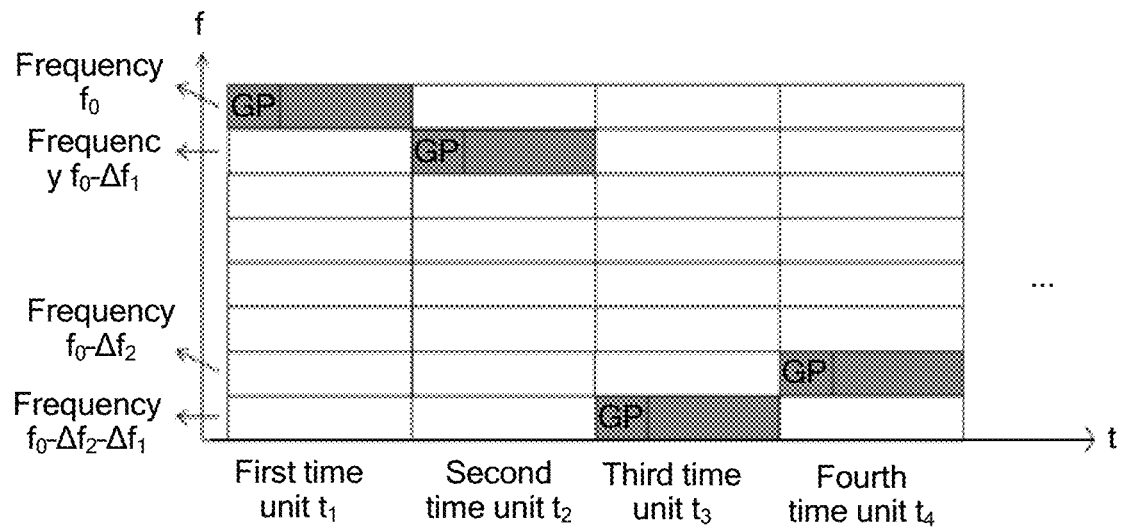

A frequency hopping pattern in FIG. 11 is used to instruct a terminal device to send a random access signal by using $f_0$ within a time unit $t_1$, send a random access signal by using "$f_0-\Delta f_1$" within a time unit $t_2$, send a random access signal by using "$f_0-\Delta f_1-\Delta f_2$" within a time unit $t_3$, and send a random access signal by using "$f_0-\Delta f_2$" within a time unit $t_4$.

In the eight frequency hopping patterns described above, $t_1$, $t_2$, $t_3$, and $t_4$ are consecutive time units, so that a random access signal from the terminal device may experience $\Delta f_1$ and $\Delta f_2$ within shortest duration, so that quantities of $\Delta f_1$ and $\Delta f_2$ are the largest. That is, in this way, each random access signal may be enabled to experience the two frequency hopping intervals as far as possible, and therefore may be used in estimation calculation of a delay corresponding to each frequency hopping interval, thereby improving use efficiency of a random access signal. In four consecutive time units after the time unit $t_4$, frequencies used within $T_5$ and $t_1$ are the same, frequencies used within $t_6$ and $t_2$ are the same, frequencies used within $t_7$ and $t_3$ are the same, and frequencies used within $t_8$ and $t_4$ are the same. By analogy, four time units are used as one cycle for sending a random access signal. Details are not described herein.

It should be noted that, alternatively, the frequencies used within the four consecutive time units after the time unit $t_4$ may be not the same as the frequencies used within $t_1$, $t_2$, $t_3$, and $t_4$. This is not specifically limited herein.

It may be understood that in actual application, alternatively, $t_1$, $t_2$, $t_3$, and $t_4$ may be set to discrete time units, or more or fewer time units may be included, provided that the terminal device can send a random access signal according to $f_0$, $\Delta f_1$, and $\Delta f_2$. This is not specifically limited herein.

It should be noted that in addition to the foregoing eight frequency hopping patterns, in actual application, more frequency hopping patterns may be further designed, provided that the terminal device can send a random access signal according to $f_0$, $\Delta f_1$, and $\Delta f_2$. This is not specifically limited herein.

302. The terminal device sends a random access signal to the base station.

In this embodiment, after receiving the random access configuration information from the base station, the terminal device may read the base frequency $f_0$, the first frequency hopping interval $\Delta f_1$, and the second frequency hopping interval $\Delta f_2$, and may further learn the parameter 1 to the parameter 5 that are described in step 301.

The terminal device may send a random access signal to the base station, as indicated by the random access configuration information, according to any one of the frequency hopping patterns in FIG. 4 to FIG. 11.

303. The base station determines target random access signals according to random access signals sent by the terminal device.

After receiving the random access signals from the terminal device, the base station may determine target random access signals in the random access signals according to $\Delta f_1$ and $\Delta f_2$.

It should be noted that at least three target random access signals are required. To better describe the technical solutions provided in this embodiment of the present application, the following uses four target random access signals as an example for description. The target random access signals include: a first random access signal, a second random access signal, a third random access signal, and a fourth random access signal.

A frequency hopping interval between a frequency used by the terminal device for sending the first random access signal and a frequency used by the terminal device for sending the second random access signal is $\Delta f_1$. A frequency hopping interval between a frequency used by the terminal device for sending the third random access signal and a frequency used by the terminal device for sending the fourth random access signal is $\Delta f_2$.

It may be understood that the second random access signal and the third random access signal may be a same random access signal, or may be different random access signals. This is not specifically limited herein.

That is, when selecting the target random access signals, the base station needs to consider a difference between the frequencies used by the terminal device for sending the random access signals, that is, the frequency hopping interval, and needs to determine the target random access signals according to $\Delta f_1$ and $\Delta f_2$.

In this embodiment, the base station may first determine a frequency hopping pattern used by the terminal device, and then determine the target random access signals according to $\Delta f_1$ and $\Delta f_2$. The following uses some examples for description.

It is assumed that a frequency hopping pattern used by the terminal device is the frequency hopping pattern shown in FIG. 4. In this case, the target random access signals that may be determined by the base station are as follows:

The first random access signal is a random access signal at a frequency "$f_0+\Delta f_1$", the second random access signal is a random access signal at a frequency $f_0$, the third random access signal is also a random access signal at a frequency $f_0$, and the fourth random access signal is a random access signal at a frequency "$f_0+\Delta f_2$". Or, the first random access signal is a random access signal at a frequency "$f_0+\Delta f_1+\Delta f_2$", the second random access signal is a random access signal at a frequency "$f_0+\Delta f_2$", the third random access signal is also a random access signal at a frequency "$f_0+\Delta f_2$", and the fourth random access signal is a random access signal at a frequency $f_0$.

Alternatively, there may be more determining manners, provided that the frequency hopping interval between the frequency used by the terminal device for sending the first random access signal and the frequency used by the terminal device for sending the second random access signal is $\Delta f_1$, and the frequency hopping interval between the frequency used by the terminal device for sending the third random access signal and the frequency used by the terminal device for sending the fourth random access signal is $\Delta f_2$. This is not specifically limited herein.

In another frequency hopping pattern, a manner in which the base station determines the target random access signals is similar. Details are not described herein again.

304. The base station obtains a phase difference between the target random access signals.

In this embodiment of the present application, that the base station may determine the phase difference between the random access signals according to the target random access signals after determining the target random access signals is specifically as follows:

The base station may determine a first phase difference between the first random access signal and the second random access signal; and the base station may determine second phase difference between the third random access signal and the fourth random access signal.

305. The base station obtains a target delay estimate $T_{final}$ corresponding to the phase difference.

In this embodiment of the present application, that the base station may obtain the corresponding target delay estimate by means of calculation according to the two phase differences after determining the first phase difference and the second phase difference is specifically as follows:

The base station determines a corresponding first delay estimate $T_{coarse}$ according to the first phase difference; and the base station determines a corresponding second delay estimate $T_{fine}$ according to the second phase difference.

Specifically, the base station may estimate a delay estimate of a random access signal by using $\theta=2\pi\cdot\Delta f\cdot T$, where $\theta$ is a phase difference, $\theta\in[0,2\pi)$, T is a delay, and $\Delta f$ is a frequency hopping interval.

After obtaining $T_{fine}$ and $T_{coarse}$ by means of calculation, the base station calculates the target delay estimate $T_{final}$ according to the following formulas:

$$T_{final} = T_{fine} + \hat{k}T_{step}; \text{ and} \quad (1)$$

$$\hat{k} = \underset{k\in Z}{\mathrm{argmin}}\{|T_{coarse} - (T_{fine} + kT_{step})|\}. \quad (2)$$

$T_{step} = 1/\Delta f_2$, and Z is a set of integers.

Formula (2) is used to calculate a value of k when $|T_{coarse}-(T_{fine}+kT_{step})|$ is minimized.

It should be noted that in addition to calculating the target delay estimate according to the foregoing formulas, the base station may further calculate the target delay estimate based on $T_{fine}$ and $T_{coarse}$ according to another calculation formula. This is not specifically limited herein.

306. The base station determines a sending advance X according to the target delay estimate $T_{final}$.

The base station may determine the sending advance X according to the target delay estimate $T_{final}$ It should be noted that the sending advance $X=T_{final}/2$, and it should be noted that a relationship between the sending advance X and the target delay estimate $T_{final}$ may be represented by another function. This is not specifically limited herein.

307. The base station sends control information to the terminal device.

The base station may send the control information to the terminal device. It should be noted that the control information includes the determined sending advance X, so as to instruct the terminal device to send uplink data to the base station according to the sending advance X.

308. The terminal device sends uplink data according to the sending advance X.

After receiving the control information from the base station, the terminal device may send uplink data to the base station according to the sending advance X.

In this embodiment of the present application, a single carrier and dual frequency hopping intervals are used as an example for description. A terminal device may receive random access configuration information from a base station. The random access configuration information includes a base frequency $f_0$, and frequency hopping intervals $\Delta f_1$ and $\Delta f_2$. The random access configuration information further includes frequency hopping pattern information, which is used to indicate a specific frequency used when the terminal device sends a random access signal. Then the terminal may send a random access signal over a random access channel to the base station as indicated by the foregoing eight frequency hopping patterns. For this embodiment of the present application, in actual application, a terminal device needs to perform a random access procedure before sending uplink data. Specifically, the terminal device needs to send a random access signal over the random access channel. The base station side receives the random access signal and estimates a propagation time of the signal. Then the base station sends a control information to the terminal device, so as to require the terminal device to send uplink data with a timing advance. In this case, a sending advance X is obtained by the base station according to a target delay estimate $T_{final}$, and the target delay estimate $T_{final}$ is obtained by the base station according to a phase difference between the random access signals, that is, the base station may calculate a delay estimate by using multiple phase differences, so as to determine the sending advance. A relatively large frequency hopping interval may improve accuracy of a delay estimate, and a relatively small frequency hopping interval may increase a coverage area of a base station. Therefore, in a used manner of multiple frequency hopping intervals in this embodiment, considerations can be given to both a coverage area and accuracy of a delay estimate in actual application.

In actual application, in addition to sending a random access signal by using a single carrier, the terminal device may further send a random access signal in a multi-carrier manner. Description is as follows:

II. A Base Station Instructs a Terminal Device to Send a Random Access Signal Based on Multiple Carriers.

Figure 12:
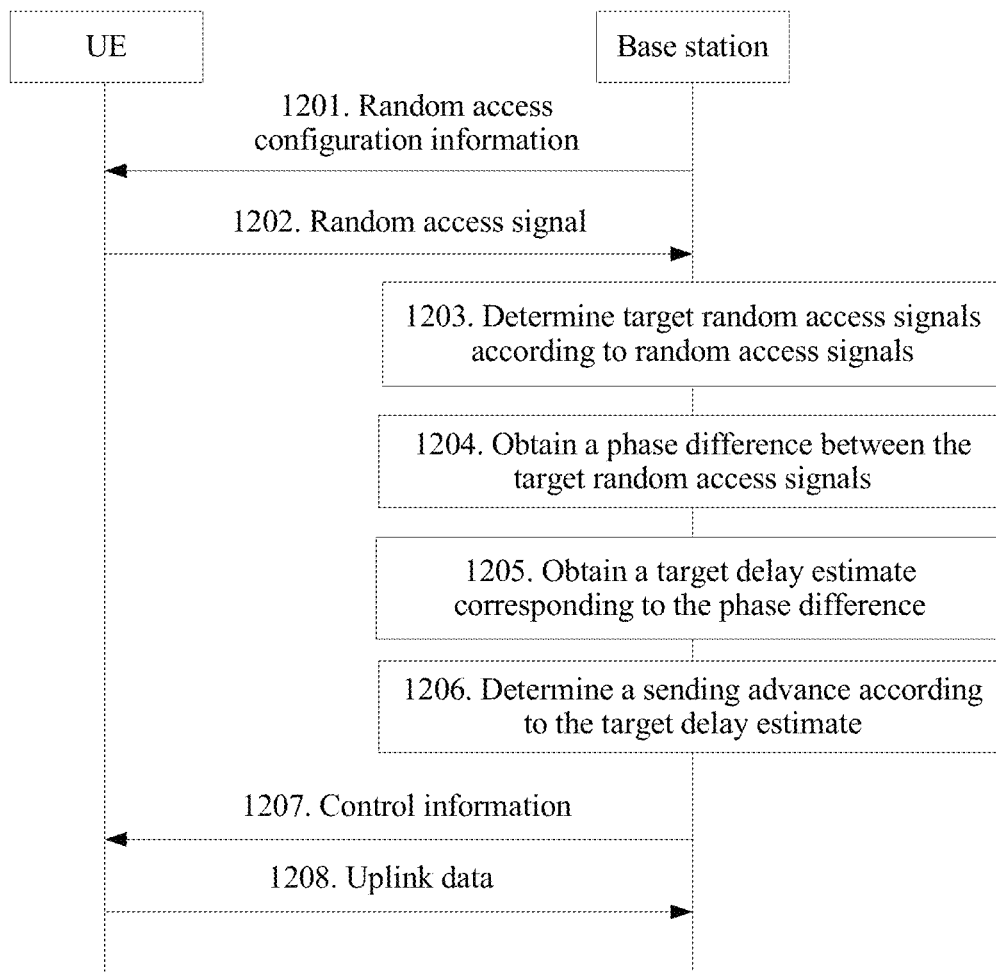
FIG. 12 is a schematic diagram of a data sending method according to another embodiment of the present application.

Referring to FIG. 12, a data sending method in an embodiment of the present application includes the following steps.

1201. A base station sends random access configuration information to a terminal device.

In this embodiment, parameter 1 to parameter 4 in the random access configuration information are the same as the parameter 1 to the parameter 4 in the embodiment shown in FIG. 3. Details are not described herein again.

Dual carriers and dual frequency hopping intervals are used as an example for description in this embodiment. The dual frequency hopping intervals are a first frequency hopping interval $\Delta f_1$ and a second frequency hopping interval $\Delta f_2$, where $\Delta f_1$ is less than $\Delta f_2$.

Based on the base frequency $f_0$, $\Delta f_1$, and $\Delta f_2$, specific frequency hopping pattern information may be in multiple forms. The following uses some specific examples for description. FIG. 13 to FIG. 20 show eight relatively common frequency hopping patterns.

Figure 13:
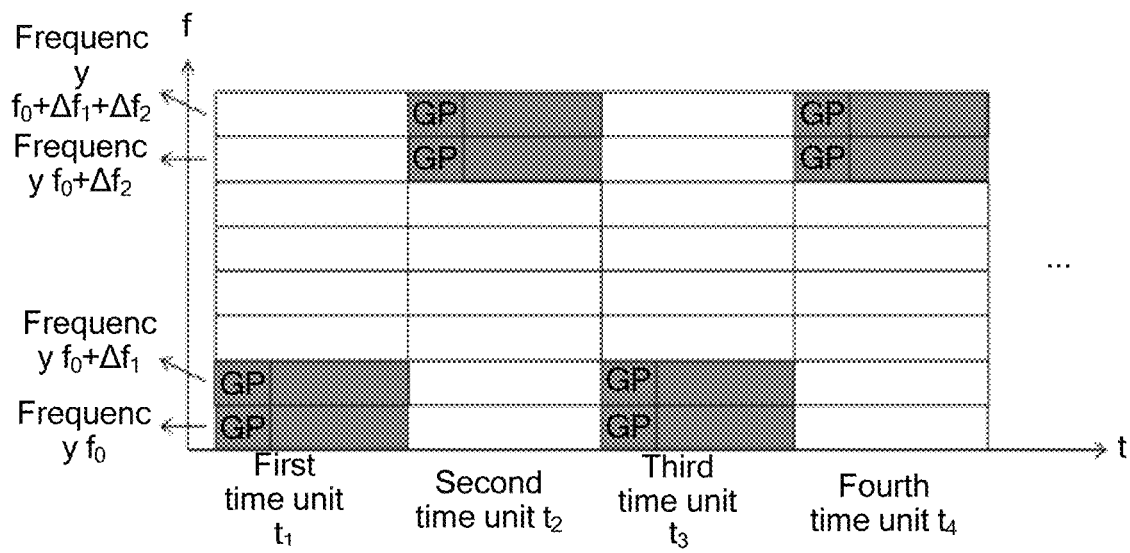
FIG. 13 to FIG. 20 are schematic diagrams of dual-carrier frequency hopping patterns according to an embodiment of the present application.

A frequency hopping pattern in FIG. 13 is used to instruct the terminal device to send a random access signal by using $f_0$ and "$f_0+\Delta f_1$" within a time unit $t_1$, and send a random access signal by using "$f_0+\Delta f_2$" and "$f_0+\Delta f_1+\Delta f_2$" within a time unit $t_2$.

Figure 14:
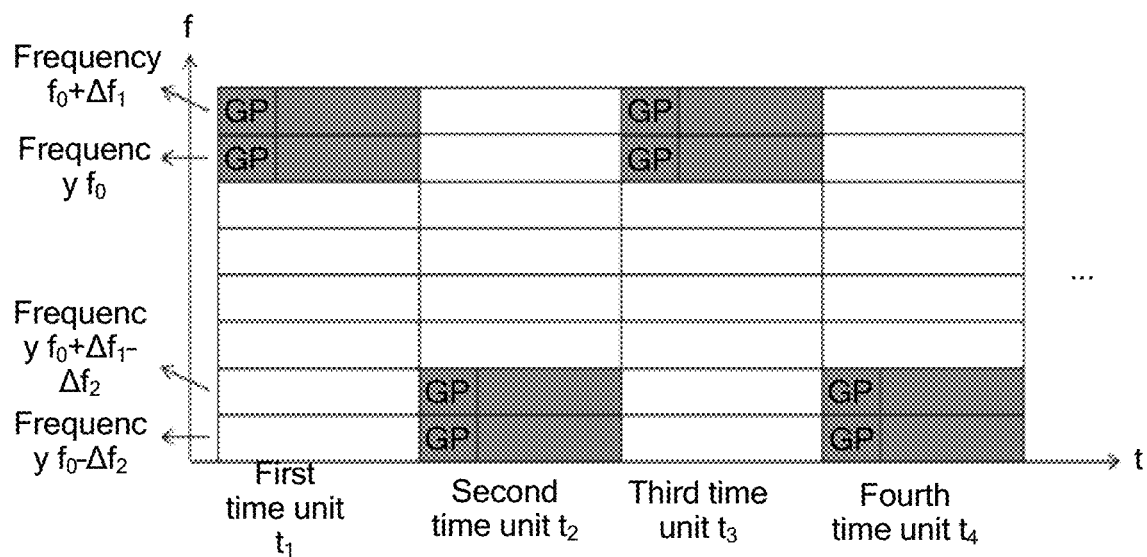

A frequency hopping pattern in FIG. 14 is used to instruct the terminal device to send a random access signal by using $f_0$ and "$f_0+\Delta f_1$" within a time unit $t_1$, and send a random access signal by using "$f_0-\Delta f_2$" and "$f_0+\Delta f_1-\Delta f_2$" within a time unit $t_2$.

Figure 15:
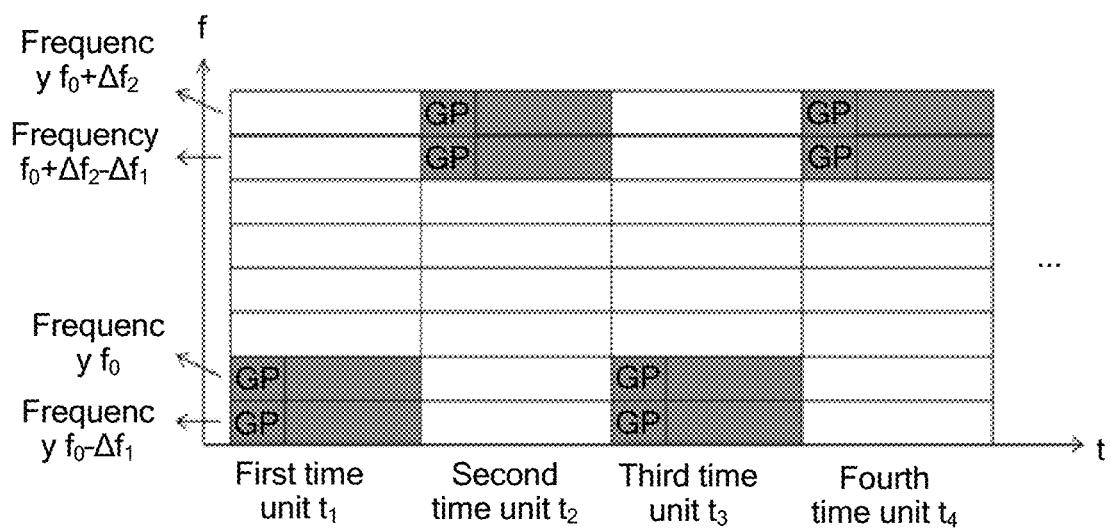

A frequency hopping pattern in FIG. 15 is used to instruct the terminal device to send a random access signal by using $f_0$ and "$f_0-\Delta f_1$" within a time unit and send a random access signal by using "$f_0+\Delta f_2-\Delta f_1$" and "$f_0+\Delta f_2$" within a time unit $t_2$.

Figure 16:
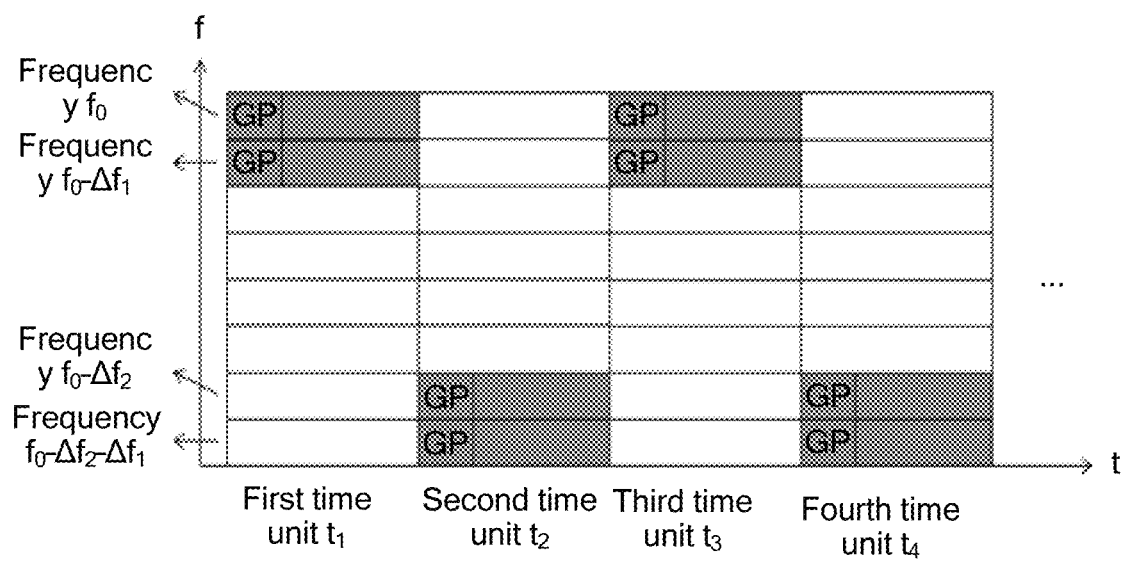

A frequency hopping pattern in FIG. 16 is used to instruct the terminal device to send a random access signal by using $f_0$ and "$f_0-\Delta f_1$" within a time unit and send a random access signal by using "$f_0-\Delta f_2$" and "$f_0-\Delta f_2-\Delta f_1$" within a time unit $t_2$.

Figure 17:
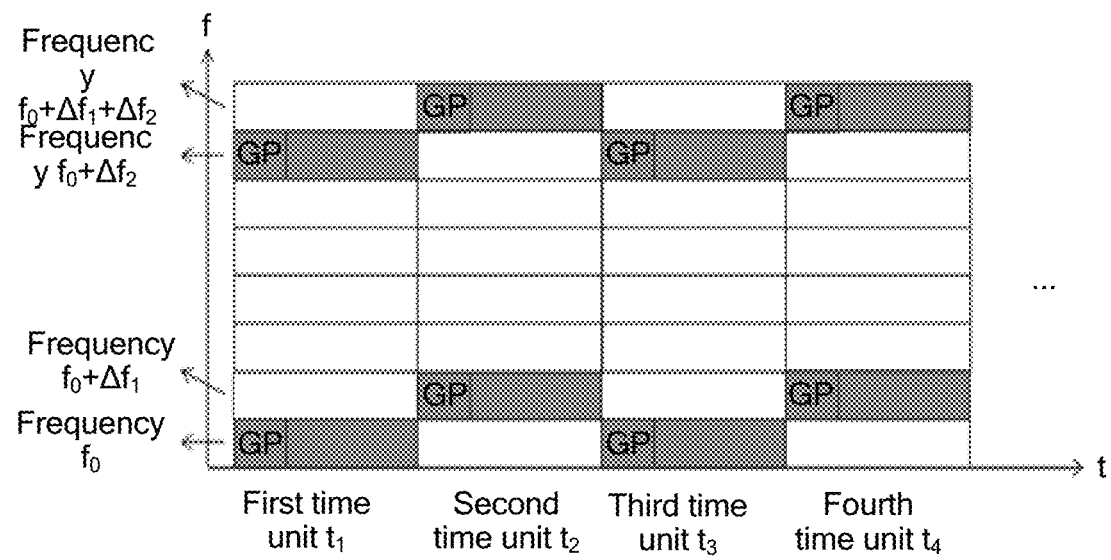

A frequency hopping pattern in FIG. 17 is used to instruct the terminal device to send a random access signal by using $f_0$ and "$f_0+\Delta f_2$" within a time unit $t_1$, and send a random access signal by using "$f_0+\Delta f_1$" and "$f_0+\Delta f_2+\Delta f_1$" within a time unit $t_2$.

Figure 18:
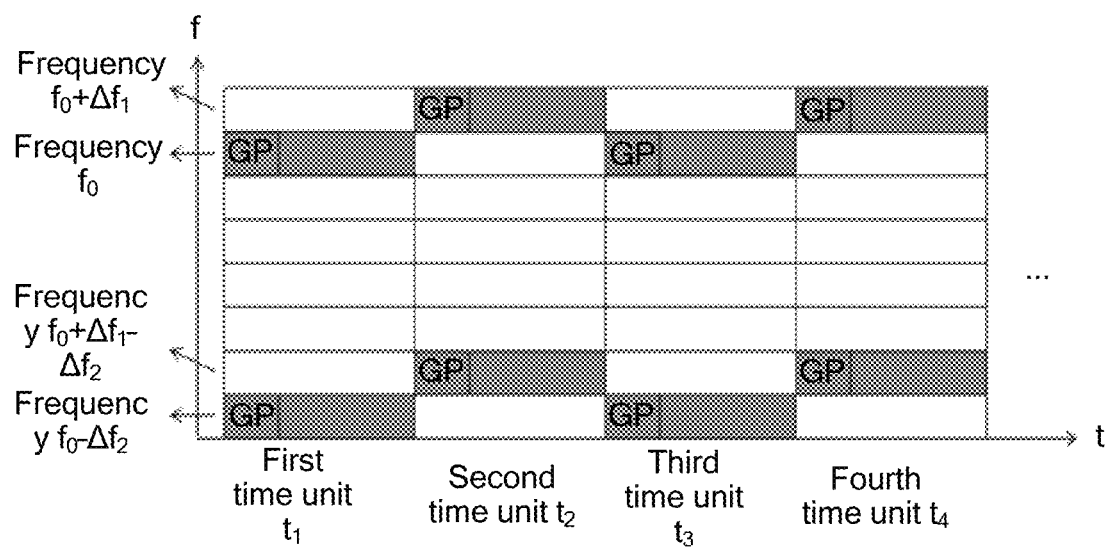

A frequency hopping pattern in FIG. 18 is used to instruct the terminal device to send a random access signal by using $f_0$ and "$f_0-\Delta f_2$" within a time unit and send a random access signal by using "$f_0+\Delta f_1$" and "$f_0+\Delta f_1-\Delta f_2$" within a time unit $t_2$.

Figure 19:
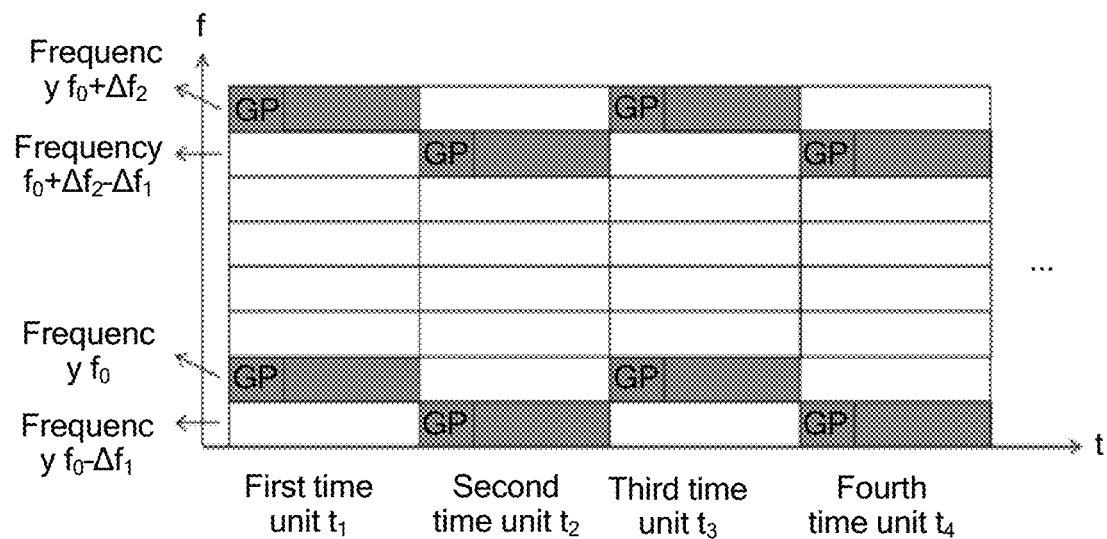

A frequency hopping pattern in FIG. 19 is used to instruct the terminal device to send a random access signal by using $f_0$ and "$f_0+\Delta f_2$" within a time unit $t_1$, and send a random access signal by using "$f_0-\Delta f_1$" and "$f_0+\Delta f_2-\Delta f_1$" within a time unit $t_2$.

Figure 20:
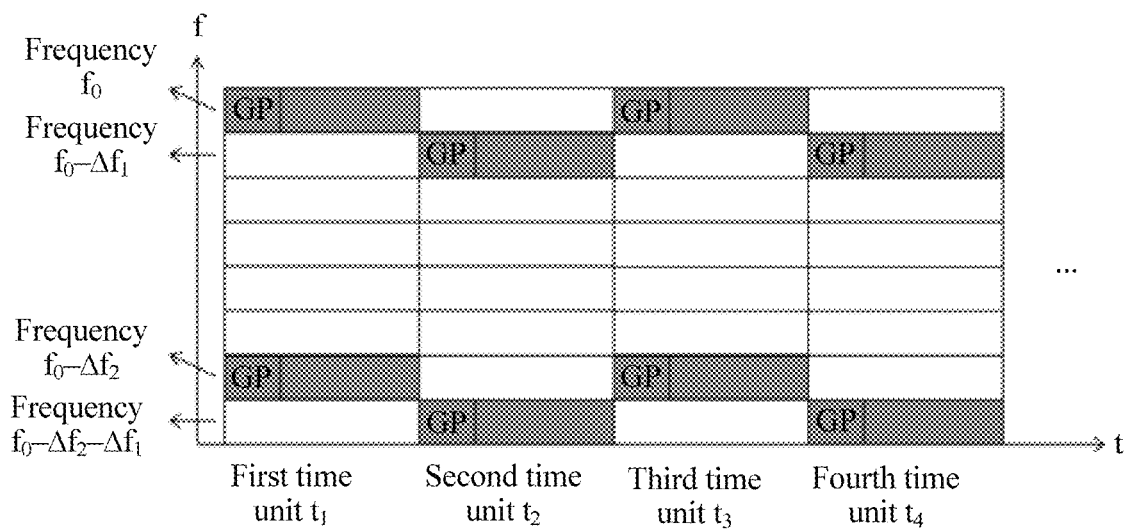

A frequency hopping pattern in FIG. 20 is used to instruct the terminal device to send a random access signal by using $f_0$ and "$f_0-\Delta f_2$" within a time unit and send a random access signal by using "$f_0-\Delta f_1$" and "$f_0-\Delta f_2-\Delta f_1$" within a time unit $t_2$.

In the eight frequency hopping patterns described above, $t_1$ and $t_2$ are consecutive time units, so that a random access signal from the terminal device may experience $\Delta f_1$ and $\Delta f_2$ within shortest duration, and therefore there are largest quantities of $\Delta f_1$ and $\Delta f_2$. That is, in this way, each random access signal may be enabled to experience the two frequency hopping intervals as far as possible, and therefore may be used in estimation calculation of a delay corresponding to each frequency hopping interval, thereby improving use efficiency of a random access signal.

It should be noted that in addition to the foregoing eight frequency hopping patterns, in actual application, more frequency hopping patterns may be further designed, provided that the terminal device can send a random access signal according to $f_0$, $\Delta f_1$, and $\Delta f_2$. This is not specifically limited herein.

It should be noted that in actual application, alternatively, $t_1$ and $t_2$ may be set to discrete time units, provided that the terminal device can send a random access signal according to $f_0$, $\Delta f_1$, and $\Delta f_2$. This is not specifically limited herein.

1202. The terminal device sends a random access signal to the base station.

In this embodiment, after receiving the random access configuration information from the base station, the terminal device may read the base frequency $f_0$, the first frequency hopping interval $\Delta f_1$, and the second frequency hopping interval $\Delta f_2$, and may further learn the parameter 1 to the parameter 5 that are described in step 1201.

The terminal device may send a random access signal to the base station, as indicated by the random access configuration information, according to any one of the frequency hopping patterns in FIG. 13 to FIG. 20.

Step 1203, step 1204, step 1205, step 1206, step 1207, and step 1208 are respectively similar to step 303, step 304, step 305, step 306, step 307, and step 308 in the foregoing embodiment. Details are not described herein again.

A difference between this embodiment and the foregoing embodiment is as follows: In this embodiment of the present application, dual carriers and dual frequency hopping intervals are used as an example for description, that is, a terminal device may send a random access signal by using two different frequencies within one time unit. On one hand, beneficial effects brought by this embodiment are the same as those brought by the foregoing embodiment. That is, a relatively large frequency hopping interval may improve accuracy of a delay estimate, and a relatively small frequency hopping interval may increase a coverage area of a base station. Therefore, in the used manner of dual carriers and dual frequency hopping intervals in this embodiment, considerations can be given to both the coverage area and the accuracy of the delay estimate. On the other hand, because the dual-carrier manner is used, that is, the terminal device may also send a random access signal by using two different frequencies within one time unit, a capacity of an entire system is expanded in this embodiment of the present application when compared with the foregoing embodiment.

The foregoing describes a data sending method in the embodiments of the present application, and the following describes a terminal device in the embodiments of the present application.

I. A Base Station Instructs a Terminal Device to Send a Random Access Signal Based on a Single Carrier.

Figure 21:
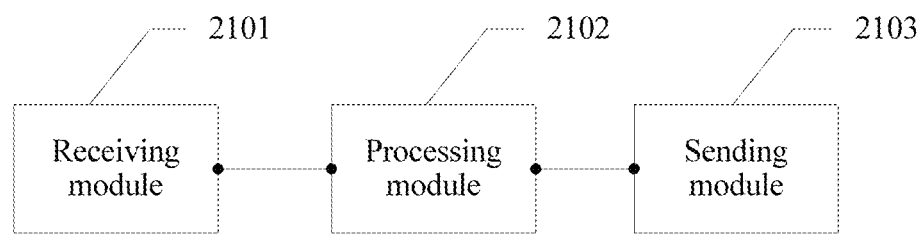
FIG. 21 is a block diagram of a terminal device according to an embodiment of the present application.

For details, refer to FIG. 21. A terminal device in an embodiment of the present application includes: a receiving module 2101, a processing module 2102, and a sending module 2103.

The receiving module 2101 is configured to receive random access configuration information from a base station.

The processing module 2102 is configured to determine a random access channel, a base frequency $f_0$, a first frequency hopping interval $\Delta f_1$, and a second frequency hopping interval $\Delta f_2$ according to the random access configuration information received by the receiving module 2101, where the first frequency hopping interval $\Delta f_1$ is less than the second frequency hopping interval $\Delta f_2$.

The random access configuration information received by the receiving module 2101 further includes: frequency hopping pattern information, where the frequency hopping pattern information is used to indicate a frequency used when the terminal device sends a random access signal within each time unit.

The sending module 2103 is configured to: according to the frequency hopping pattern information received by the receiving module 2101, send a random access signal using a first frequency within a first time unit, send a random access signal using a second frequency within a second time unit, send a random access signal using a third frequency within a third time unit, and send a random access signal using a fourth frequency within a fourth time unit. The first time unit, the second time unit, the third time unit, and the fourth time unit are consecutive or discrete time units. The first frequency, the second frequency, the third frequency, and the fourth frequency are determined according to the base frequency $f_0$, the first frequency hopping interval $\Delta f_1$, and the second frequency hopping interval $\Delta f_2$. Specific values of the first frequency, the second frequency, the third frequency, and the fourth frequency may be values indicated by any one of the single-carrier frequency hopping patterns shown in FIG. 4 to FIG. 12. Details are not described herein again.

The receiving module 2101 is further configured to receive control information fed back by the base station, where the control information includes a sending advance, the sending advance is obtained by the base station according to a delay estimate, and the delay estimate is determined by the base station according to a phase difference between random access signals from the sending module 2103 and the base frequency $f_0$, the first frequency hopping interval $\Delta f_1$, and the second frequency hopping interval $\Delta f_2$ that are determined by the processing module 2102.

The sending module 2103 is further configured to send uplink data according to the sending advance received by the receiving module 2101.

Figure 22:
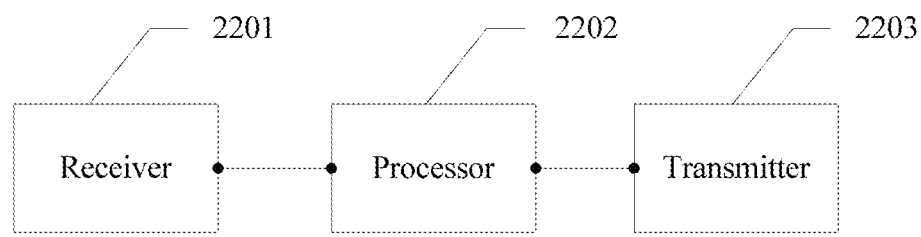
FIG. 22 is a block diagram of a terminal device according to another embodiment of the present application.

Referring to FIG. 22, an entity apparatus corresponding to the receiving module 2101 is a receiver 2201, an entity apparatus corresponding to the processing module 2102 is a processor 2202, and an entity apparatus corresponding to the sending module 2203 is a transmitter 2203.

II. A Base Station Instructs a Terminal Device to Send a Random Access Signal Based on Multiple Carriers.

Figure 23:
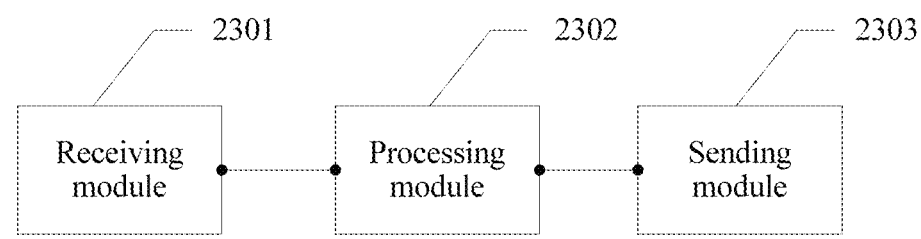
FIG. 23 is a block diagram of a terminal device according to yet another embodiment of the present application.

For details, refer to FIG. 23. A terminal device in an embodiment of the present application includes: a receiving module 2301, a processing module 2302, and a sending module 2303.

The receiving module 2301 and the processing module 2302 are respectively similar to the receiving module 2201 and the processing module 2202 in terms of functions. Details are not described herein again.

Random access configuration information received by the receiving module 2301 further includes:

frequency hopping pattern information, where the frequency hopping pattern information is used to indicate a frequency used when the terminal device sends a random access signal within each time unit.

The sending module 2303 is configured to: according to the frequency hopping pattern information received by the receiving module 2301, send a random access signal by using a first frequency and a second frequency within a first time unit, and send a random access signal by using a third frequency and a fourth frequency within a second time unit. The first time unit and the second time unit are consecutive or discrete time units. The first frequency, the second frequency, the third frequency, and the fourth frequency are determined according to the base frequency $f_0$, the first frequency hopping interval $\Delta f_1$, and the second frequency hopping interval $\Delta f_2$. Specific values of the first frequency, the second frequency, the third frequency, and the fourth frequency may be values indicated by any one of the dual-carrier frequency hopping patterns shown in FIG. 13 to FIG. 20. Details are not described herein again.

The receiving module 2301 is further configured to receive control information fed back by the base station, where the control information includes a sending advance, the sending advance is obtained by the base station according to a delay estimate, and the delay estimate is determined by the base station according to a phase difference between random access signals from the sending module 2303 and the base frequency $f_0$, the first frequency hopping interval $\Delta f_1$, and the second frequency hopping interval $\Delta f_2$ that are determined by the processing module 2302.

The sending module 2303 is further configured to send uplink data according to the sending advance received by the receiving module 2301.

Figure 24:
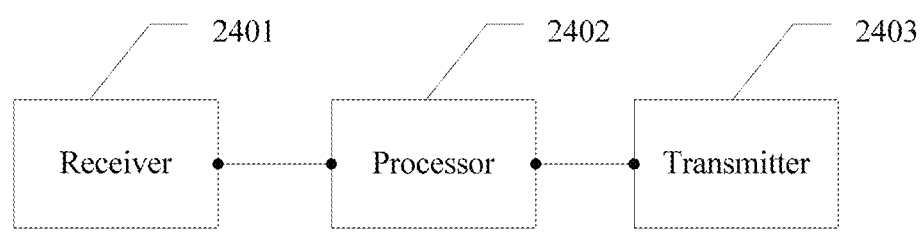
FIG. 24 is a block diagram of a terminal device according to still another embodiment of the present application.

Referring to FIG. 24, an entity apparatus corresponding to the receiving module 2301 is a receiver 2401, an entity apparatus corresponding to the processing module 2302 is a processor 2402, and an entity apparatus corresponding to the sending module 2303 is a transmitter 2403.

The foregoing describes a terminal device in the embodiments of the present application, and the following describes a base station in the embodiments of the present application.

I. A Base Station Instructs a Terminal Device to Send a Random Access Signal Based on a Single Carrier.

Figure 25:
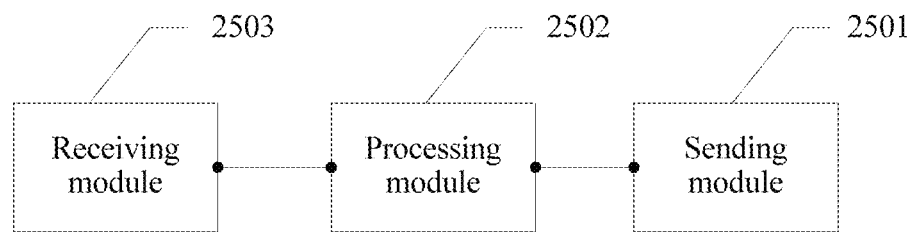
FIG. 25 is a block diagram of a base station according to an embodiment of the present application.

Referring to FIG. 25, a base station in an embodiment of the present application includes: a sending module 2501, a receiving module 2503, and a processing module 2502.

The sending module 2501 is configured to send random access configuration information to a terminal device, where the random access configuration information is used to indicate a random access channel, a base frequency $f_0$, a first frequency hopping interval $\Delta f_1$, and a second frequency hopping interval $\Delta f_2$, and the first frequency hopping interval $\Delta f_1$ is less than the second frequency hopping interval $\Delta f_2$.

The random access configuration information from the sending module 2501 further includes:

frequency hopping pattern information, where the frequency hopping pattern information is used to instruct the terminal device to send a random access signal by using a first frequency within a first time unit, send a random access signal by using a second frequency within a second time unit, send a random access signal by using a third frequency within a third time unit, and send a random access signal by using a fourth frequency within a fourth time unit. The first time unit, the second time unit, the third time unit, and the fourth time unit are consecutive or discrete time units. The first frequency, the second frequency, the third frequency, and the fourth frequency are determined according to the base frequency $f_0$, the first frequency hopping interval $\Delta f_1$, and the second frequency hopping interval $\Delta f_2$. Specific values of the first frequency, the second frequency, the third frequency, and the fourth frequency may be values indicated by any one of the single-carrier frequency hopping patterns shown in FIG. 4 to FIG. 12. Details are not described herein again.

The receiving module 2503 is configured to receive a random access signal that is sent over the random access channel indicated by the random access configuration information from the sending module 2501, and that is sent by the terminal device according to the base frequency $f_0$, the first frequency hopping interval $\Delta f_1$, and the second frequency hopping interval $\Delta f_2$ that are indicated by the random access configuration information from the sending module 2501.

The processing module 2502 is specifically configured to:

determine a first random access signal, a second random access signal, a third random access signal, and a fourth random access signal as target random access signals, where a frequency hopping interval between a frequency of the first random access signal received by the receiving module 2503 and a frequency of the second random access signal received by the receiving module 2503 is the first frequency hopping interval $\Delta f_1$, a frequency hopping interval between a frequency of the third random access signal received by the receiving module 2503 and a frequency of the fourth random access signal received by the receiving module 2503 is the second frequency hopping interval $\Delta f_2$, and the second random access signal received by the receiving module 2503 and the third random access signal received by the receiving module 2503 are a same random access signal or different random access signals;

determine a first phase difference between the first random access signal received by the receiving module 2503 and the second random access signal received by the receiving module 2503, and determine a second phase difference between the third random access signal received by the receiving module 2503 and the fourth random access signal received by the receiving module 2503;

determine a corresponding first delay estimate $T_{coarse}$ according to the first phase difference, and determine a corresponding second delay estimate $T_{fine}$ according to the second phase difference; and calculate a target delay estimate $T_{final}$ according to the following formulas:

$$T_{final} = T_{fine} + \hat{k}T_{step}; \text{ and}$$

$$\hat{k} = \underset{k \in Z}{\operatorname{argmin}}\{|T_{coarse} - (T_{fine} + kT_{step})|\}, \text{ where}$$

$$T_{step} = 1/\Delta f_2, \text{ and } Z \text{ is a set of integers.}$$

Figure 26:
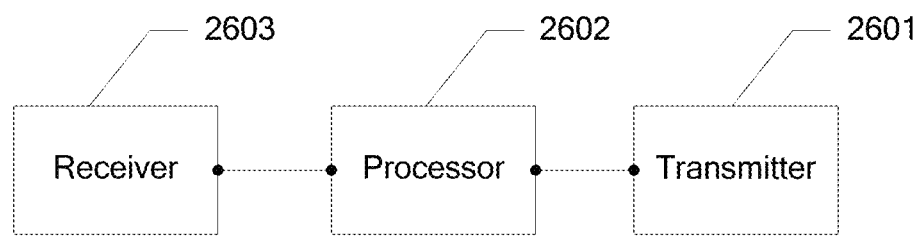
FIG. 26 is a block diagram of a base station according to another embodiment of the present application.

Referring to FIG. 26, an entity apparatus corresponding to the sending module 2501 is a transmitter 2601, an entity apparatus corresponding to the receiving module 2503 is a receiver 2603, and an entity apparatus corresponding to the processing module 2502 is a processor 2602.

II. A Base Station Instructs a Terminal Device to Send a Random Access Signal Based on Multiple Carriers.

Figure 27:
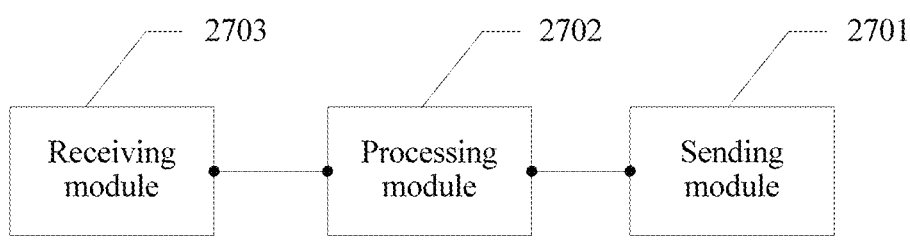
FIG. 27 is a block diagram of a base station according to yet another embodiment of the present application.

Referring to FIG. 27, a base station in another embodiment of the present application includes: a sending module 2701, a receiving module 2703, and a processing module 2702.

The sending module 2701 is configured to send random access configuration information to a terminal device, where the random access configuration information is used to indicate a random access channel, a base frequency $f_0$, a first frequency hopping interval $\Delta f_1$, and a second frequency hopping interval $\Delta f_2$, and the first frequency hopping interval $\Delta f_1$ is less than the second frequency hopping interval $\Delta f_2$.

The random access configuration information sent by the sending module 2701 further includes:

frequency hopping pattern information, where the frequency hopping pattern information is used to instruct the terminal device to send a random access signal by using a first frequency and a second frequency within a first time unit, and send a random access signal by using a third frequency and a fourth frequency within a second time unit. The first time unit and the second time unit are consecutive or discrete time units. The first frequency, the second frequency, the third frequency, and the fourth frequency are determined according to the base frequency $f_0$, the first frequency hopping interval $\Delta f_1$, and the second frequency hopping interval $\Delta f_2$. Specific values of the first frequency, the second frequency, the third frequency, and the fourth frequency may be values indicated by any one of the dual-carrier frequency hopping patterns shown in FIG. 13 to FIG. 20. Details are not described herein again.

The receiving module 2703 and the processing module 2702 are respectively similar to the receiving module 2503 and the processing module 2502 in terms of functions. Details are not described herein again.

Figure 28:
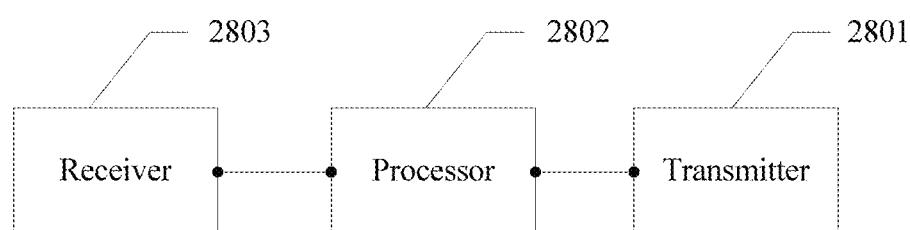
FIG. 28 is a block diagram of a base station according to still another embodiment of the present application.

Referring to FIG. 28, an entity apparatus corresponding to the sending module 2701 is a transmitter 2801, an entity apparatus corresponding to the receiving module 2703 is a receiver 2803, and an entity apparatus corresponding to the processing module 2702 is a processor 2802.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, function units in the embodiments of the present application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of the present application essentially, or the part contributing to the prior art, or all or some of the technical solutions may be implemented in the form of a software product. The software product is stored in a storage medium and includes several instructions for instructing a computer device (which may be a personal computer, a server, or a network device) to perform all or some of the steps of the methods described in the embodiments of the present application. The foregoing storage medium includes: any medium that can store program code, such as a USB flash drive, a removable hard disk, a read-only memory (ROM), a random access memory (RAM), a magnetic disk, or an optical disc.

The foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present application.

What is claimed is:

1. A method for sending random access signals, performed by a terminal device, comprising:
   receiving frequency hopping pattern information from a base station, wherein the frequency hopping pattern information indicates frequencies to be used by the terminal device in sending a random access signal within one or more time units;
   sending the random access signal to the base station by using a first frequency within a first time unit on a random access channel;
   sending the random access signal to the base station by using a second frequency within a second time unit on the random access channel;
   sending the random access signal to the base station by using a third frequency within a third time unit on the random access channel; and
   sending the random access signal to the base station by using a fourth frequency within a fourth time unit on the random access channel;
   wherein the first time unit, the second time unit, the third time unit, and the fourth time unit are consecutive or discrete time units;
   wherein the first frequency, the second frequency, the third frequency, and the fourth frequency depend on one or more of: a base frequency $f_0$, a first frequency hopping interval $\Delta f_1$, or a second frequency hopping interval $\Delta f_2$, and $\Delta f_1 < \Delta f_2$; wherein
   the first frequency is $f_0$, the second frequency is "$f_0 + \Delta f_1$", the third frequency is "$f_0 + \Delta f_1 + \Delta f_2$", and the fourth frequency is "$f_0 + \Delta f_2$"; or
   the first frequency is $f_0$, the second frequency is "$f_0 + \Delta f_1$", the third frequency is "$f_0 + \Delta f_1 + \Delta f_2$", and the fourth frequency is "$f_0 + \Delta f_2$"; or
   the first frequency is $f_0$, the second frequency is "$f_0 - \Delta f_1$", the third frequency is "$f_0 + \Delta f_2 - \Delta f_1$", and the fourth frequency is "$f_0 + \Delta f_2$"; or
   the first frequency is $f_0$, the second frequency is "$f_0 - \Delta f_1$", the third frequency is "$f_0 - \Delta f_1 - \Delta f_2$", and the fourth frequency is "$f_0 - \Delta f_2$".

2. The method according to claim 1, further comprising:
   after sending the random access signal, receiving, by the terminal device, a sending advance; and
   sending, by the terminal device, uplink data according to the sending advance.

3. A method for receiving random access signals, performed by a base station, comprising:
   sending frequency hopping pattern information to a terminal device, wherein the frequency hopping pattern information indicates frequencies to be used by the terminal device in sending a random access signal within one or more time units over a random access channel;
   receiving the random access signal sent by the terminal device using a first frequency within a first time unit;
   receiving the random access signal sent by the terminal device using a second frequency within a second time unit;
   receiving the random access signal sent by the terminal device using a third frequency within a third time unit;
   receiving the random access signal sent by the terminal device using a fourth frequency within a fourth time unit;
   wherein the first time unit, the second time unit, the third time unit, and the fourth time unit are consecutive or discrete time units;
   wherein the first frequency, the second frequency, the third frequency, and the fourth frequency depend on one or more of: a base frequency $f_0$, a first frequency hopping interval $\Delta f_1$, or a second frequency hopping interval $\Delta f_2$, and $\Delta f_1 < \Delta f_2$; wherein
   the first frequency is $f_0$, the second frequency is "$f_0 + \Delta f_1$", the third frequency is "$f_0 + \Delta f_1 + \Delta f_2$", and the fourth frequency is "$f_0 + \Delta f_2$"; or
   the first frequency is $f_0$, the second frequency is "$f_0 + \Delta f_1$", the third frequency is "$f_0 + \Delta f_1 - \Delta f_2$", and the fourth frequency is "$f_0 - \Delta f_2$"; or
   the first frequency is $f_0$, the second frequency is "$f_0 - \Delta f_1$", the third frequency is "$f_0 + \Delta f_2 - \Delta f_1$", and the fourth frequency is "$f_0 + \Delta f_2$"; or
   the first frequency is $f_0$, the second frequency is "$f_0 - \Delta f_1$", the third frequency is "$f_0 - \Delta f_1 - \Delta f_2$", and the fourth frequency is "$f_0 - \Delta f_2$".

4. The method according to claim 3, further comprising:
   after receiving the random access signal over the random access channel within each time unit, determining, by the base station, at least three target random access signals according to the first and second frequency hopping intervals;
   obtaining, by the base station, a phase difference between the target random access signals;
   obtaining, by the base station, a target delay estimate corresponding to the phase difference;
   determining, by the base station, a sending advance according to the target delay estimate; and
   sending, by the base station, the sending advance to the terminal device.

5. A terminal device, comprising:
   at least one processor, and a memory storing computer-executable instructions;
   wherein the computer-executable instructions, when executed by the at least one processor, cause the terminal device to:
   receive frequency hopping pattern information from a base station, wherein the frequency hopping pattern information indicates frequencies to be used by the terminal device in sending a random access signal within one or more time units;
   send the random access signal to the base station by using a first frequency within a first time unit on a random access channel;

send the random access signal to the base station by using a second frequency within a second time unit on the random access channel;

send the random access signal to the base station by using a third frequency within a third time unit on the random access channel; and send the random access signal to the base station by using a fourth frequency within a fourth time unit on the random access channel;

wherein the first time unit, the second time unit, the third time unit, and the fourth time unit are consecutive or discrete time units;

wherein the first frequency, the second frequency, the third frequency, and the fourth frequency depend on one or more of: a base frequency $f_0$, a first frequency hopping interval $\Delta f_1$, or a second frequency hopping interval $\Delta f_2$, and $\Delta f_1 < \Delta f_2$; wherein the first frequency is $f_0$, the second frequency is "$f_0+\Delta f_1$", the third frequency is "$f_0+\Delta f_1+\Delta f_2$", and the fourth frequency is "$f_0+\Delta f_2$"; or the first frequency is $f_0$, the second frequency is "$f_0+\Delta f_1$", the third frequency is "$f_0+\Delta f_1-\Delta f_2$", and the fourth frequency is "$f_0-\Delta f_2$"; or the first frequency is $f_0$, the second frequency is "$f_0-\Delta f_1$", the third frequency is "$f_0+\Delta f_2-\Delta f_1$", and the fourth frequency is "$f_0+\Delta f_2$"; or the first frequency is $f_0$, the second frequency is "$f_0-\Delta f_1$", the third frequency is "$f_0-\Delta f_1-\Delta f_2$", and the fourth frequency is "$f_0-\Delta f_2$".

6. The terminal device according to claim 5, wherein the computer-executable instructions, when executed by the at least one processor, further cause the terminal device to:
after the random access signal is sent, receive a sending advance from the base station; and
send uplink data according to the sending advance.

7. A base station, comprising:
at least one processor, and a memory storing computer-executable instructions; wherein the computer-executable instructions, when executed by the at least one processor, cause the base station to:
send frequency hopping pattern information to a terminal device, wherein the frequency hopping pattern information indicates frequencies to be used by the terminal device in sending a random access signal within one or more time units over the random access channel;
receive the random access signal sent by the terminal device using a first frequency within a first time unit;
receive the random access signal sent by the terminal device using a second frequency within a second time unit;
receive the random access signal sent by the terminal device using a third frequency within a third time unit;
receive the random access signal sent by the terminal device using a fourth frequency within a fourth time unit;

wherein the first time unit, the second time unit, the third time unit, and the fourth time unit are consecutive or discrete time units;

wherein the first frequency, the second frequency, the third frequency, and the fourth frequency depend on one or more of: a base frequency $f_0$, a first frequency hopping interval $\Delta f_1$, or a second frequency hopping interval $\Delta f_2$, and $\Delta f_1 < \Delta f_2$; wherein the first frequency is $f_0$, the second frequency is "$f_0+\Delta f_1$", the third frequency is "$f_0+\Delta f_1+\Delta f_2$", and the fourth frequency is "$f_0+\Delta f_2$"; or the first frequency is $f_0$, the second frequency is "$f_0+\Delta f_1$", the third frequency is "$f_0+\Delta f_1-\Delta f_2$", and the fourth frequency is "$f_0-\Delta f_2$"; or the first frequency is $f_0$, the second frequency is "$f_0-\Delta f_1$", the third frequency is "$f_0+\Delta f_2-\Delta f_1$", and the fourth frequency is "$f_0+\Delta f_2$"; or the first frequency is $f_0$, the second frequency is "$f_0-\Delta f_1$", the third frequency is "$f_0-\Delta f_1-\Delta f_2$", and the fourth frequency is "$f_0-\Delta f_2$".

8. The base station according to claim 7, wherein the computer-executable instructions further cause the base station to:
after receiving the random access signals over the random access channel within each time unit, determine at least three target random access signals according to the first and second frequency hopping intervals;
obtain a phase difference between the target random access signals;
obtain a target delay estimate corresponding to the phase difference; and
determine a sending advance according to the target delay estimate.

9. The base station according to claim 8, wherein the computer-executable instructions further cause the base station to:
send control information to the terminal device, wherein the control information comprises the sending advance.

* * * * *

UNITED STATES PATENT AND TRADEMARK OFFICE
CERTIFICATE OF CORRECTION

PATENT NO. : 10,568,133 B2
APPLICATION NO. : 16/003102
DATED : February 18, 2020
INVENTOR(S) : Chen et al.

Page 1 of 1

It is certified that error appears in the above-identified patent and that said Letters Patent is hereby corrected as shown below:

In the Specification

In Column 17, Line 34, rewrite "time unit" as -- time unit $t_1$, --.

In Column 17, Line 39, rewrite "time unit" as -- time unit $t_1$, --.

In Column 17, Line 49, rewrite "time unit" as -- time unit $t_1$, --.

In Column 17, Line 59, rewrite "time unit" as -- time unit $t_1$, --.

Signed and Sealed this
Twenty-seventh Day of September, 2022

Katherine Kelly Vidal
*Director of the United States Patent and Trademark Office*